(12) United States Patent
Nakadoi et al.

(10) Patent No.: US 12,477,199 B2
(45) Date of Patent: Nov. 18, 2025

(54) VIBRATION DEVICE AND IMAGING DEVICE

(71) Applicant: Murata Manufacturing Co., Ltd., Nagaokakyo (JP)

(72) Inventors: Takahide Nakadoi, Nagaokakyo (JP); Hitoshi Sakaguchi, Nagaokakyo (JP); Noritaka Kishi, Nagaokakyo (JP); Yuuki Ishii, Nagaokakyo (JP); Rei Higashida, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 55 days.

(21) Appl. No.: 18/670,769

(22) Filed: May 22, 2024

(65) Prior Publication Data

US 2024/0314411 A1  Sep. 19, 2024

Related U.S. Application Data

(63) Continuation of application No. PCT/JP2022/031856, filed on Aug. 24, 2022.

(30) Foreign Application Priority Data

Dec. 28, 2021  (JP) .................. 2021-214631

(51) Int. Cl.
  *H04N 23/52*  (2023.01)
  *B06B 1/06*  (2006.01)
  (Continued)

(52) U.S. Cl.
  CPC .............. *H04N 23/52* (2023.01); *B06B 1/06* (2013.01); *B06B 1/0651* (2013.01); *G03B 15/00* (2013.01);
  (Continued)

(58) Field of Classification Search
  CPC ........ H04N 23/50; H04N 23/51; H04N 23/52; H04N 23/54; H04N 23/55; H04N 23/57;
  (Continued)

(56) References Cited

U.S. PATENT DOCUMENTS

2018/0117642 A1  5/2018  Magee et al.
2019/0176195 A1*  6/2019  Fujimoto .............. B06B 1/0607
(Continued)

FOREIGN PATENT DOCUMENTS

JP  2019536018 A  12/2019
WO  2018100795 A1  6/2018
(Continued)

OTHER PUBLICATIONS

International Search Report in PCT/JP2022/031856, mailed Nov. 15, 2022, 3 pages.
(Continued)

*Primary Examiner* — Twyler L Haskins
*Assistant Examiner* — Akshay Trehan
(74) *Attorney, Agent, or Firm* — Keating & Bennett, LLP

(57) ABSTRACT

A vibration device includes an internal vibration body to amplify a vibration, a piezoelectric element connected to one end of the internal vibration body, and a light transmission body connected to an another end of the internal vibration body. The vibration device further includes an external vibration body including a first connection portion connected to the light transmission body and a second connection portion extending outward of the light transmission body from the first connection portion to attenuate the vibration.

25 Claims, 22 Drawing Sheets

(51) Int. Cl.
*G03B 15/00* (2021.01)
*G03B 17/02* (2021.01)
*G03B 17/08* (2021.01)
*G03B 30/00* (2021.01)
*H04N 23/54* (2023.01)
*H04N 23/55* (2023.01)
*H04N 23/57* (2023.01)

(52) U.S. Cl.
CPC ............ *G03B 17/02* (2013.01); *G03B 17/08* (2013.01); *G03B 30/00* (2021.01); *H04N 23/54* (2023.01); *H04N 23/55* (2023.01); *H04N 23/57* (2023.01); *G03B 2205/0061* (2013.01)

(58) Field of Classification Search
CPC ......... B06B 1/06; B06B 1/0651; G03B 15/00; G03B 17/02; G03B 17/08; G03B 30/00; G03B 2205/0061
See application file for complete search history.

(56) References Cited

U.S. PATENT DOCUMENTS

2021/0154702 A1* 5/2021 Fujimoto ............... G03B 17/08
2023/0004072 A1 1/2023 Ishii et al.

FOREIGN PATENT DOCUMENTS

| WO | 2021038942 A1 | 3/2021 |
| WO | 2021186898 A1 | 9/2021 |
| WO | 2021210208 A1 | 10/2021 |

OTHER PUBLICATIONS

Written Opinion in PCT/JP2022/031856, mailed Nov. 15, 2022, 3 pages.

* cited by examiner

VIBRATION DEVICE AND IMAGING DEVICE

CROSS REFERENCE TO RELATED APPLICATIONS

This application claims the benefit of priority to Japanese Patent Application No. 2021-214631, filed on Dec. 28, 2021, and is a Continuation Application of PCT Application No. PCT/JP2022/031856, filed on Aug. 24, 2022. The entire contents of each application are hereby incorporated herein by reference.

BACKGROUND OF THE INVENTION

1. Field of the Invention

The present invention relates to vibration devices and imaging devices, and particularly relates to vibration devices including piezoelectric elements.

2. Description of the Related Art

In the related art, a vibration device that removes liquid droplets adhering to a light flux passing region of a light transmission body is known.

For example, International Publication No. 2021/186898 discloses a vibration device including a vibration unit connected to an end portion of the light transmission body to generate a bending vibration in the light transmission body. In the vibration device disclosed in International Publication No. 2021/186898, a vibration of the vibration unit is controlled, and a predetermined vibration is generated for the light transmission body to minimize and remove the adhering liquid droplets.

However, in the vibration device disclosed in International Publication No. 2021/186898, an end of a housing is connected to a thin portion that amplifies the vibration, and the other end is connected to a base plate that supports an imaging unit. Therefore, in some cases, depending on a vibration frequency of the vibration unit, the vibration of the thin portion may be transmitted to the base plate through the housing, the vibration device may be vibrated as a whole, and the imaging unit may also be vibrated.

SUMMARY OF THE INVENTION

Therefore, example embodiments the present invention provide vibration devices and imaging devices which each reduce a possibility that a vibration of an internal vibration body is transmitted to an outer portion.

According to an example embodiment of the present invention, a vibration device includes an internal vibration body to amplify a vibration, a piezoelectric element connected to one end of the internal vibration body, a light transmission body connected to another end of the internal vibration body, and an external vibration body including a first connection portion connected to the another end of the internal vibration body and a second connection portion extending outward of the light transmission body from the first connection portion to attenuate the vibration.

According to another example embodiment of the present invention, an imaging device includes a vibration device and an image sensor. The vibration device includes an internal vibration body to amplify a vibration, a piezoelectric element connected to one end of the internal vibration body, a lens connected to another end of the internal vibration body, an external vibration body including a first connection portion connected to the another end side of the internal vibration body, a second connection portion extending outward of the light transmission body from the first connection portion to attenuate the vibration, and a lens module provided on an optical axis of the lens. The image sensor is located on the optical axis of the lens and the lens module.

According to example embodiments of the present invention, it is possible to provide vibration devices and imaging devices which each reduce a possibility that a vibration of an internal vibration body is transmitted to an outer portion.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
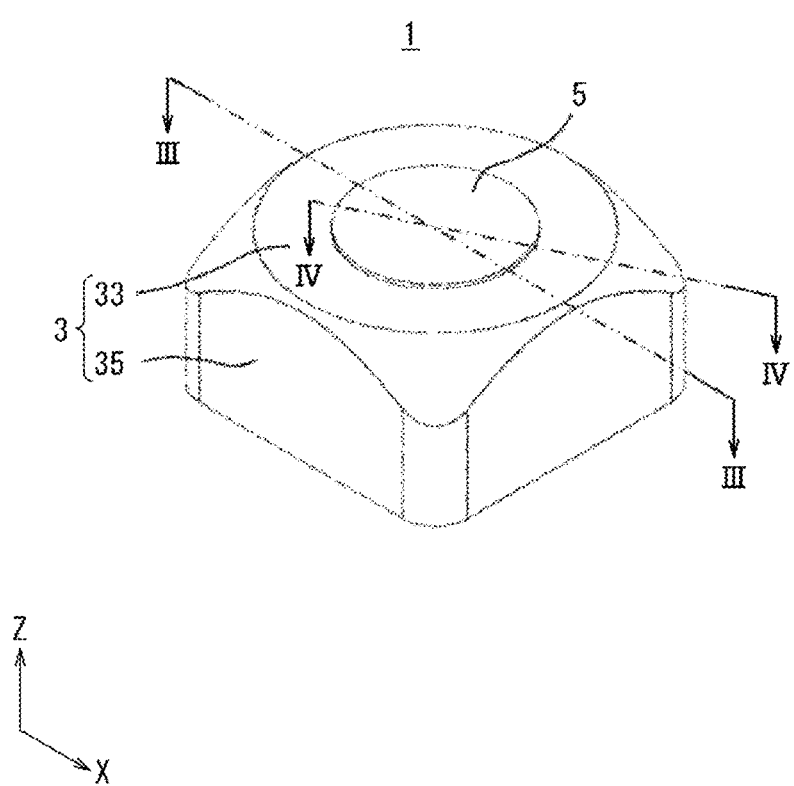
FIG. 1 is an external perspective view showing a vibration device according to an example embodiment of the present invention.

Vibration devices according to a first example of the present invention includes an internal vibration body to amplify a vibration, a piezoelectric element connected to one end of the internal vibration body, a light transmission body connected to the another end of the internal vibration body, and an external vibration body including a first connection portion connected to the other end side of the internal vibration body and a second connection portion extending outward of the light transmission body from the first connection portion to attenuate the vibration.

According to this configuration, it is possible to reduce a possibility that a vibration of an internal vibration body is transmitted to an outer portion.

As a vibration device according to a second example of the present invention, in the vibration device of the first example, the second connection portion extends in a direction perpendicular or substantially perpendicular to a direction in which light is transmitted through the light transmission body. In this manner, it is possible to reduce a possibility that the vibration of the second connection portion affects the vibration of the light transmission body.

As a vibration device according to a third example of the present invention, in the vibration device of the second example, the second connection portion annularly extends. In this manner, it is possible to reduce a possibility that the internal vibration body is exposed to water droplets or moisture, and it is possible to reduce corrosion fatigue of the internal vibration body.

As a vibration device according to a fourth example of the present invention, in the vibration device of any one of the first to third examples, the second connection portion is located closer to the piezoelectric element than an end of the first connection portion which is spaced away from the piezoelectric element in the first direction.

In this manner, when the present invention is applied to a camera, visual field obstruction reflected in a video is less likely to occur. Therefore, the present invention can correspond to the light transmission body having a wide angle of view.

As a vibration device according to a fifth example of the present invention, in the vibration device of any one of the first to fourth examples, the external vibration body includes a fixing portion connected to the second connection portion, and the second connection portion has a thickness smaller than a thickness of the fixing portion. In this manner, it is possible to further improve absorption of the vibration in the second connection portion.

As a vibration device according to a sixth example of the present invention, in the vibration device of any one of the first to fifth examples, the first connection portion includes a protruding portion that protrudes to a light transmission body side, and the light transmission body is pinched between the protruding portion of the first connection portion and the other end of the internal vibration body. Mechanical fixing can ensure falling prevention of the light transmission body.

As a vibration device according to a seventh example of the present invention, in the vibration device of any one of the first to fifth examples, the vibration device further includes a pressing portion that pinches the light transmission body together with the other end of the internal vibration body in the first direction. The first connection portion is connected to the light transmission body with the pressing portion interposed therebetween. A gap is provided between the first connection portion and the other end of the internal vibration body in a radial direction with respect to an optical axis extending along the first direction of the light transmission body. The pressing portion includes a main body portion extending in a circumferential direction with respect to the optical axis of the light transmission body, and opposing the other end of the internal vibration body in the first direction, the light transmission body being located between the other end of the internal vibration body and the main body portion, a first leg portion and a second leg portion which are respectively provided in the main body portion, which are located at an interval in the circumferential direction with respect to the optical axis, and which are located in the gap by extending from the main body portion toward the other end of the internal vibration body along the first direction, a first projecting portion provided in an end of the first leg portion which is spaced away from the main body portion in the first direction, and extending inward in a radial direction with respect to the optical axis, the light transmission body and the other end of the internal vibration body being located between the main body portion and the first projecting portion in the first direction, and a second projecting portion provided in an end of the second leg portion which is spaced away from the main body portion in the first direction, and extending outward in the radial direction, the first connection portion being located between the main body portion and the second projecting portion in the first direction. Mechanical fixing can ensure falling prevention of the light transmission body.

As a vibration device according to an eighth example of the present invention, in the vibration device of any one of the first to fifth examples, the vibration device further includes a cap including a cap body that covers the first connection portion in the direction intersecting the first direction, and a cap including a protruding portion provided in an end of the cap body which is spaced away from the piezoelectric element in the first direction, protruding toward the light transmission body along the direction intersecting the first direction, and opposing the other end of the internal vibration body in the first direction, the cap connecting the first connection portion to the light transmission body by pinching the light transmission body between the protruding portion and the other end of the internal vibration body. While mechanical fixing can ensure falling prevention of the light transmission body, a load of the light transmission body can be reduced.

As a vibration device according to a ninth example of the present invention, in the vibration device of any one of the first to fifth examples, the vibration device further includes a cap including a cap body located between the light transmission body and the first connection portion in the direction intersecting the first direction, and extending along the first direction, and a protruding portion provided in an end of the cap body which is spaced away from the piezoelectric element in the first direction, protruding toward the light transmission body along the direction intersecting the first direction, and opposing the other end of the internal vibration body in the first direction. A gap is provided between the light transmission body and the first connection portion in the direction intersecting the first direction. The cap body is located in the gap. The cap connects the first connection portion to the light transmission body by pinching the light transmission body between the protruding portion and the other end of the internal vibration body. While mechanical fixing can ensure falling prevention of the light transmission body, a load of the light transmission body can be reduced.

As a vibration device according to a tenth example of the present invention, in the vibration device of any one of the first to ninth examples, the vibration device further includes a fitting portion connected to the first connection portion of the external vibration body on the other end side of the internal vibration body. The fitting portion of the internal vibration body and the first connection portion of the external vibration body are fixed by tightening of a screw structure. Tightening strength is controlled by a torque amount of a screw, and vibration performance can be stabilized.

As a vibration device according to an eleventh example of the present invention, in the vibration device of any one of the first to ninth examples, the internal vibration body includes a fitting portion provided in the other end in the first direction and connected to the first connection portion of the external vibration body. The fitting portion includes a projecting portion extending outward of the light transmission body from the other end of the internal vibration body in the first direction along the direction intersecting the first direction. The first connection portion includes a second recessed portion that accommodates the projecting portion to be fittable. The fitting portion of the internal vibration body and the first connection portion of the external vibration body are fixed by fitting between the projecting portion and the second recessed portion. In this manner, costs for fixing the internal vibration body and the external vibration body can be reduced.

As a vibration device according to a twelfth example of the present invention, in the vibration device of any one of the first to ninth examples, the vibration device further includes an intermediate body to fix the internal vibration body and the external vibration body. The internal vibration body includes a fitting portion provided in the other end in the first direction and connected to the first connection portion of the external vibration body. A gap to which the intermediate body is fitted is provided between the first connection portion and the fitting portion in the direction intersecting the first direction. The fitting portion of the internal vibration body and the first connection portion of the external vibration body are fixed by fitting the intermediate body into the gap. In this manner, costs for fixing the internal vibration body and the external vibration body can be reduced.

As a vibration device according to a thirteenth example of the present invention, in the vibration device of any one of the first to ninth examples, the internal vibration body includes a fitting portion provided in the other end in the first direction and connected to the first connection portion of the external vibration body. Any one of the internal vibration body and the external vibration body is configured to be rotatable around a rotation axis extending along the first direction with respect to the other of the internal vibration body and the external vibration body. A plurality of groove portions respectively extending in a circumferential direction with respect to the rotation axis are provided in any one of the first connection portion and the fitting portion. A plurality of claw portions respectively extending in a radial direction with respect to the rotation axis and accommodated to be respectively fittable to the plurality of groove portions are provided in the other of the first connection portion and the fitting portion. The fitting portion of the internal vibration body and the first connection portion of the external vibration body are fixed by the fitting between the plurality of groove portions and the plurality of claw portions. In this manner, costs for fixing the internal vibration body and the external vibration body can be reduced.

As a vibration device according to a fourteenth example of the present invention, in the vibration device of the fifth example, the light transmission body is a lens. The vibration device further includes a lens module provided on an optical axis of the lens. In this manner, the vibration device 1 can be used as an image forming optical system.

As a vibration device according to a fifteenth example of the present invention, in the vibration device of the fourteenth example, the lens module is connected to a fixing portion of the external vibration body. In this manner, optical performance can be ensured by using the lens and the lens module as a set, and the vibration device can be assembled to an imaging device in the same handling manner as that of a normal lens module.

As a vibration device according to a sixteenth example of the present invention, in the vibration device of any one of the first to fifteenth examples, the internal vibration body has a cylindrical shape, and the external vibration body has a hollow quadrangular columnar shape. In this manner, a volume of the fixing portion of the external vibration body can be increased, and the vibration can be further reduced.

As a vibration device according to a seventeenth example of the present invention, in the vibration device of any one of the first to sixteenth examples, a Young's modulus of a material of the internal vibration body is higher than a Young's modulus of a material of the external vibration body. Since the Young's moduli of the internal vibration body and the external vibration body are different from each other, desired vibration performance can be obtained.

As a vibration device according to an eighteenth example of the present invention, in the vibration device of any one of the first to seventeenth examples, the external vibration body includes a fixing portion connected to the second connection portion. A Young's modulus of the second connection portion of the external vibration body is higher than a Young's modulus of the fixing portion of the external vibration body. In this manner, the vibration of the fixing portion of the external vibration body is advantageously confined.

As a vibration device according to a nineteenth example of the present invention, in the vibration device of any one of the first to seventeenth examples, the external vibration body includes a fixing portion connected to the second connection portion. A density of the second connection portion of the external vibration body is lower than a density of the fixing portion of the external vibration body. In this manner, vibration stability of the fixing portion of the external vibration body can be further improved.

As a vibration device according to a twentieth example of the present invention, in the vibration device of the eighteenth example or the nineteenth example, the second connection portion includes a first portion located farther from the piezoelectric element than the fixing portion in the first direction and extending from the first connection portion along the direction intersecting the first direction, and a second portion extending from an end of the first portion which is spaced away from the first connection portion in the direction intersecting the first direction toward the piezoelectric element along the first direction. The fixing portion includes a joint portion provided in an end close to the first portion in the first direction, extending along the direction intersecting the first direction, and to which the second portion is joined. A dimension of the second portion in the first direction is equal to or larger than a dimension of the first portion in the first direction. In this manner, stress applied to a joint portion between the second connection portion and the fixing portion can be reduced.

As a vibration device according to a twenty-first example of the present invention, in the vibration device of the eighteenth example or the nineteenth example, the second connection portion includes a first portion located farther from the piezoelectric element than the fixing portion in the first direction and extending from the first connection portion along the direction intersecting the first direction, and a second portion extending from an end of the first portion which is spaced away from the first connection portion in the direction intersecting the first direction toward the piezoelectric element along the first direction. The fixing portion includes a joint portion provided in an end spaced away from the internal vibration body in the direction intersecting the first direction, extending along the first direction, and to which the second portion is joined. In this manner, the joint portion is not exposed to an outer portion. Therefore, joining reliability between the second connection portion and the fixing portion is improved.

As a vibration device to a twenty-second example of the present invention, in the vibration device of any one of the first to twenty-first examples, the external vibration body includes a fixing portion connected to the second connection portion. The light transmission body includes an optical axis extending along the first direction. A distance from the optical axis in a radial direction with respect to the optical axis to an inner side end of at least a portion of the fixing portion in the radial direction is shorter than a distance from the optical axis in the radial direction to an outer side end of the internal vibration body in the radial direction. In this manner, a volume of the fixing portion can be increased. Therefore, vibration stability of the fixing portion of the external vibration body can be further improved.

As a vibration device according to a twenty-third example of the present invention, in the vibration device of any one of the first to twenty-second examples, the internal vibration body includes a tubular body portion and a thin portion, and the thin portion has a smaller thickness than the tubular body portion. Since the thin portion is provided in the internal vibration body, performance deterioration caused by adhering water droplets can be further reduced.

An imaging device according to twenty-fourth example embodiment of the present invention includes a vibration device and an image sensor. The vibration device includes an internal vibration body that amplifies a vibration, a piezoelectric element connected to one end of the internal vibration body, a lens connected to the other end of the internal vibration body, an external vibration body including a first connection portion connected to the other end side of the internal vibration body and a second connection portion extending outward of a light transmission body from the first connection portion to attenuate the vibration, and a lens module provided on an optical axis of the lens. The image sensor is provided on the optical axis of the lens and the lens module.

According to this configuration, the vibration of the lens is absorbed by the second connection portion. Therefore, it is possible to prevent a possibility that a blurred image is captured due to the vibration of the lens.

As an imaging device according to a twenty-fifth example of the present invention, in the imaging device of the twenty-fourth example, a position of a bottom surface of the external vibration body in an optical axis direction is located between a bottom surface of the piezoelectric element and an imaging plane of the image sensor. In this manner, the image sensor does not slip into the vibration device. Therefore, the imaging device is easily assembled.

Hereinafter, example embodiments of the present invention will be described with reference to the accompanying drawings. The following description is merely an example in essence, and is not intended to limit the present invention, an applicable object thereof, or an application thereof. Furthermore, the drawings are schematic, and proportions of respective dimensions do not necessarily coincide with actual proportions.

Example Embodiment

First, benefits of the present invention will be described in more detail. A camera used outdoors, such as a vehicle-mounted camera, a surveillance camera, or a camera mounted on a drone, is provided with an exposed lens or a cover formed of glass or transparent plastic to cover a lens. When water droplets adhere to the lens or the cover, in some cases, foreign substances may be reflected in an image captured by the camera, and a clear image cannot be obtained since a field of view of the camera is blocked.

Figure 2:
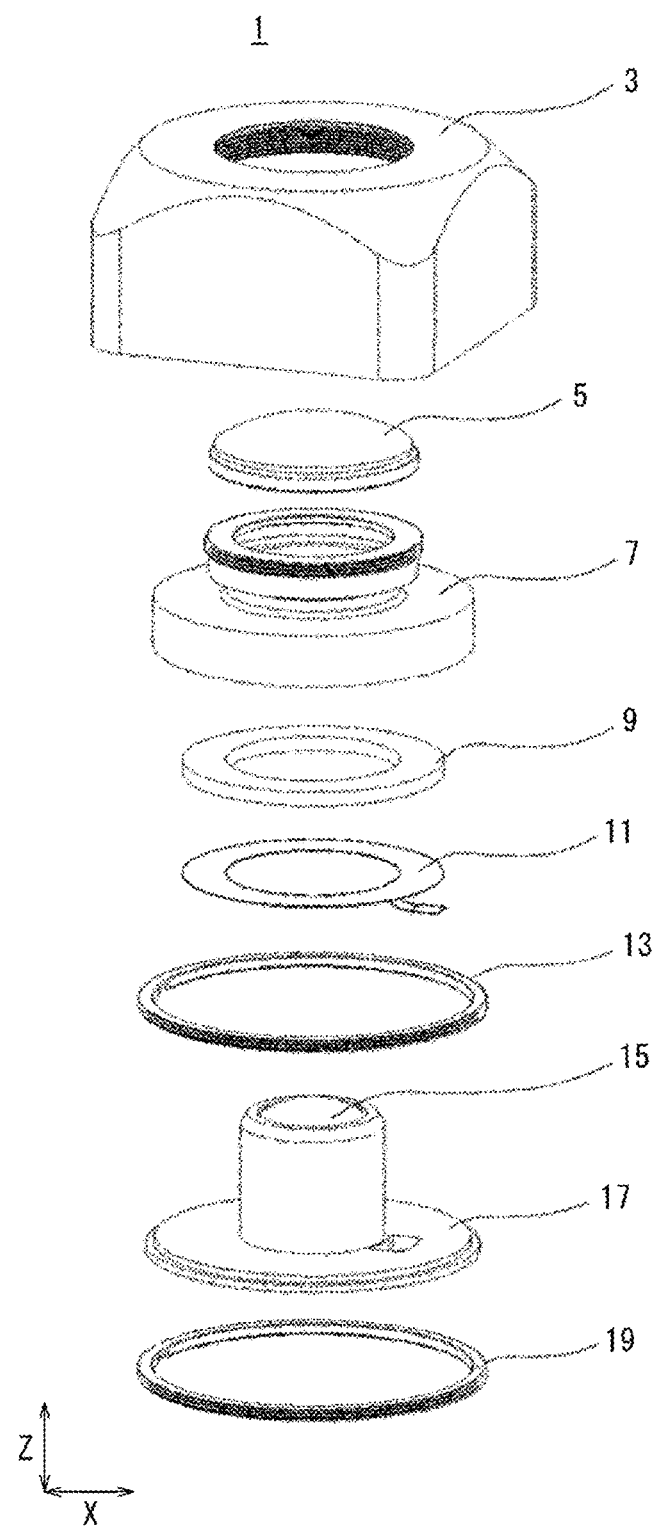
FIG. 2 is an exploded perspective view of the vibration device in FIG. 1.

A vibration device 1 of the present example embodiment will be described with reference to FIGS. 1 and 2. FIG. 1 is an external perspective view of the vibration device 1 of the example embodiment. FIG. 2 is an exploded perspective view of the vibration device 1. A Z-axis (example of a first direction) is an example of an optical axis direction of a lens 5 and a lens module 15, and an X-axis (example of a direction intersecting the first direction) is an example of a radial direction of the lens 5.

The vibration device 1 includes an external vibration body 3, the lens 5, an internal vibration body 7, a piezoelectric element 9, a power feeding conductor 11, a first stop ring 13, the lens module 15, a lens barrel 17, and a second stop ring 19.

The vibration device 1 transmits a vibration of the piezoelectric element 9 provided in contact with the internal vibration body 7 to the lens 5 with the internal vibration body 7 interposed therebetween, causes the lens 5 to vibrate, and removes foreign substances such as water droplets or mud adhering to the lens 5.

Figure 3:
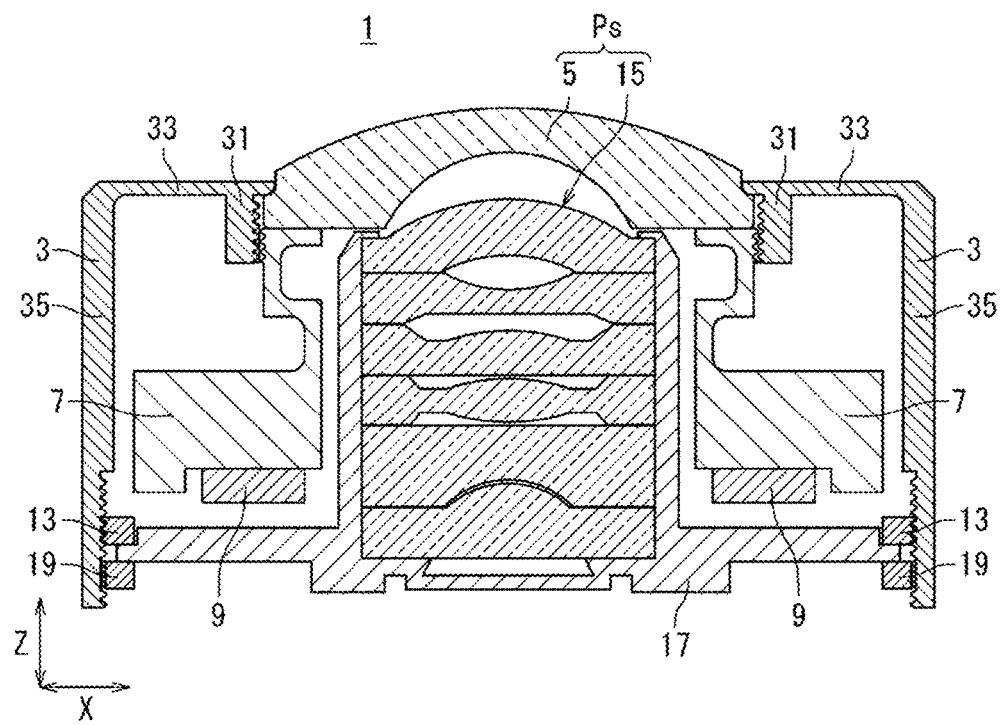
FIG. 3 is a sectional view taken along an arrow III of the vibration device in FIG. 1.
Figure 4:
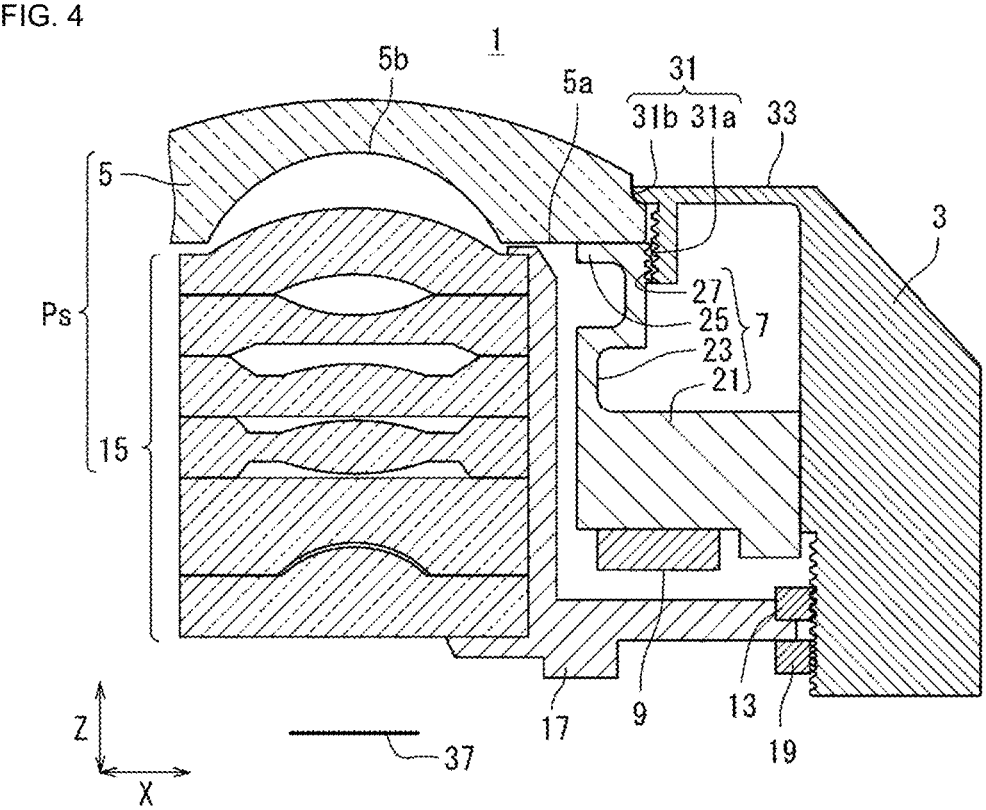
FIG. 4 is a sectional view taken along an arrow IV of the vibration device in FIG. 1.

Each component defining the vibration device 1 will be described in detail below with reference to FIGS. 3 and 4. FIG. 3 is a sectional view of the vibration device 1. FIG. 4 is a partially enlarged view of the vibration device 1.

The internal vibration body 7 amplifies the vibration transmitted from the piezoelectric element 9 to cause the lens 5 to vibrate. For example, the internal vibration body 7 has a cylindrical shape, and a metal material or ceramic can be used. For example, the metal material preferably includes stainless steel, aluminum, iron, titanium, and duralumin. In order to improve close contact of an adhesive on a surface of the internal vibration body 7, it is preferable to perform surface treatment such as oxidation treatment or alumite treatment. For example, when the surface of the internal vibration body 7 preferably has a black color through the surface treatment, it is possible to further prevent optical performance from being degraded due to light scattering.

The internal vibration body 7 is preferably a tubular structure including a tubular body portion 21, a thin portion 23, a mounting portion 25, and a fitting portion 27. The piezoelectric element 9 is attached to the tubular body portion 21 on one end side of the internal vibration body 7, and the piezoelectric element 9 causes the tubular body portion 21 to vibrate. The thin portion 23 connects the tubular body portion 21 and the mounting portion 25. The thin portion 23 has a smaller thickness than the tubular body portion 21. Therefore, the thin portion 23 serves as a spring, and can expand the vibration. Therefore, the thin portion 23 plays a role of expanding the vibration when the vibration generated in the tubular body portion 21 is transmitted to the lens 5. When a Young's modulus of a material of the internal vibration body 7 is high, a loss can be reduced when the vibration is expanded.

In the internal vibration body 7, the mounting portion 25 is provided on the other end side further from the thin portion 23. The mounting portion 25 is flat, and an outer peripheral portion of the lens 5 is mounted on the mounting portion 25. The lens 5 may be fixed to the mounting portion 25 by using an adhesive. The mounting portion 25 has a shape that protrudes inward from the thin portion 23. The fitting portion 27 is provided on an outer side portion in a radial direction of the mounting portion 25, on the other end side of the internal vibration body 7. The fitting portion 27 includes a screw structure, and is connected to the external vibration body 3 (to be described later).

The external vibration body 3 can reduce or prevent the vibration of the internal vibration body 7 from escaping to a member other than the lens 5, and can efficiently transmit the vibration to the lens 5. In addition, the external vibration body 3 is provided to cover the entire or substantially the entire internal vibration body 7 such that the internal vibration body 7 or the lens module 15 is protected from the outer side portion. The external vibration body 3 is preferably made of a metal material such as, for example, stainless steel, aluminum, iron, titanium, and duralumin, or a resin. For example, the external vibration body 3 has a hollow quadrangular columnar shape.

The external vibration body 3 includes a first connection portion 31, a second connection portion 33, and a fixing portion 35. A screw structure 31a is on one end side of the first connection portion 31, and the first connection portion 31 of the external vibration body 3 and the fitting portion 27 of the internal vibration body 7 are fixed by tightening of the screw structure.

The first connection portion 31 includes a protruding portion 31b that protrudes toward the lens 5 side on the other end side. The lens 5 is pinched between the protruding portion 31b of the first connection portion 31 and the mounting portion 25 on the other end side of the internal vibration body 7. In this manner, the lens 5 is pinched between the outer side portion and the inner side portion of the lens 5. Therefore, even when the lens 5 vibrates, it is possible to prevent the lens 5 from being detached from the vibration device 1.

The second connection portion 33 has a role in which the vibration generated by the lens 5 is absorbed such that the vibration is not transmitted to the fixing portion 35 connected to the second connection portion 33. For example, the second connection portion 33 annularly extends in a direction perpendicular to the optical axis direction of the lens 5. The thickness of the second connection portion 33 is smaller than the thickness of the fixing portion 35, and for example, the thickness is equal to or larger than about 0.2 mm and equal to or smaller than about 1.0 mm. In addition, the thickness of the second connection portion 33 is equal to or more than about 0.2 times and equal to or less than about 1.5 times the thickness of the thin portion 23. The second connection portion 33 has a thin thickness in this way. Therefore, the second connection portion 33 has a property of a plate spring.

For example, the fixing portion 35 has the following role. A member such as a case that accommodates the image sensor or the lens module 15 is connected to the fixing portion 35. The fixing portion 35 includes a node to reduce or prevent the vibration to be about $1/100$ or less of a displacement amount of the lens 5 such that the vibration does not propagate to these members. As a volume of the fixing portion 35 increases, the vibration of the fixing portion 35 can be reduced or prevented. On the other hand, a size of the imaging device needs to be small, and it is difficult to simply increase the size.

Therefore, in the present example embodiment, an outer shape of the fixing portion 35 is quadrangular. According to this shape, the volume of the fixing portion 35 can be increased without increasing the size of the imaging device. For example, the volume of a cuboid having the size of about 25 mm×about 25 mm is larger than the volume of a columnar shape having a diameter of about 25 mm. Therefore, when the quadrangle is used, the volume of four corner portions can be effectively utilized, and the volume of the fixing portion 35 can be increased without increasing the size of the imaging device.

When the external vibration body 3 includes a recess such as groove, for example, the recess causes foreign substances such as water droplets or mud to be accumulated in the recess, and further causes vibration performance to deteriorate due to the accumulated foreign substances. For example, corner portions of the external vibration body 3 are preferably chamfered by R about 2.5 or more. In this manner, there is an advantageous effect of reducing metal fatigue caused by an ultrasound vibration. In addition, since the corner portions of the external vibration body 3 are chamfered, even when the lens 5 having a wide angle of view of about 180 degrees or more, it is possible to reduce a possibility that the corner portions of the external vibration body 3 are imaged on a captured image.

Performance required for materials of the external vibration body 3 and the internal vibration body 7 is different. When the external vibration body 3 has a lower Young's modulus, the vibration can be attenuated by the second connection portion 33. In addition, for example, in the external vibration body 3, the second connection portion 33 has the lower Young's modulus than the fixing portion 35.

The lens 5 forms an optical imaging plane in cooperation with the lens module 15, and is located in an outermost layer of an optical system Ps including the lens 5 and the lens module 15. The lens 5 is formed of glass. An upper surface of the lens 5 has a protruding shape, and the surface is coated with a water-repellent coating and an anti-reflection film (AR coating). The surface of the lens 5 on the optical imaging plane side includes a planar portion 5a and a recessed shape 5b, and the planar portion 5a is connected to the mounting portion 25 of the internal vibration body 7 by an adhesive.

The piezoelectric element 9 has a piezoelectric body and an electrode. The piezoelectric element 9 is connected to the tubular body portion 21 of the internal vibration body 7 by an adhesive. For example, the material of the piezoelectric body preferably includes appropriate piezoelectric ceramics such as, for example, barium titanate ($BaTiO_3$), lead zirconate titanate (PZT: $PbTiO_3 \cdot PbZrO_3$), lead titanate ($PbTiO_3$), lead metaniobate ($PbNb_2O_6$), bismuth titanate ($Bi_4Ti_3O_{12}$), and (K,Na)$NbO_3$, or appropriate piezoelectric single crystal such as $LiTaO_3$ and $LiNbO_3$.

For example, the electrode may be a Ni electrode. The electrode may be an electrode made of a metal thin film such as, for example, Ag or Au, which is formed by a sputtering method. Alternatively, the electrode can be formed by plating or vapor deposition, in addition to the sputtering method.

In the present example embodiment, the piezoelectric element 9 that generates the vibration has a ring shape when viewed in an axial direction (Z-direction) of the internal vibration body 7. However, without being limited thereto, the piezoelectric element 9 may have any shape as long as the internal vibration body 7 can vibrate.

The piezoelectric element 9 is controlled by a controller, for example. For example, the controller includes a drive circuit to apply a drive signal to generate the vibration. For example, the drive circuit is connected to the piezoelectric element 9 with the power feeding conductor 11 interposed therebetween. The power feeding conductor 11 is connected to the piezoelectric element 9 by an adhesive to apply a potential to the piezoelectric element 9. As the power feeding conductor 11, flexible printed circuits (FPC) having flexibility are preferably used, and a wiring line is formed of a copper foil on a polyimide substrate.

The drive circuit includes a printed circuit board on which mounting components are mounted, and has a function of generating an AC potential having an appropriate frequency and applying the potential to a piezoelectric body through the power feeding conductor 11. The piezoelectric element 9 causes the internal vibration body 7 to vibrate in a thickness direction (Z-direction) of the vibration device 1, based on a drive signal from the drive circuit. The piezoelectric element 9 vibrates such that the internal vibration body 7 vibrates in the thickness direction (Z-direction). In the vibration device 1, the lens 5 is caused to vibrate by causing the internal vibration body 7 to vibrate, and the foreign substances such as the water droplet adhering to the lens 5 are removed.

The lens module 15 preferably includes a plurality of lenses, and is supported by the lens barrel 17. Since the lens 5 and the lens module 15 are combined, the lens module 15 has optical performance in which an image can be formed as the image sensor.

The lens barrel 17 preferably includes a flange, and the flange is connected to the fixing portion 35 of the external vibration body 3. Since the lens 5 and the lens module 15 are not in contact with each other, the vibration of the lens 5 is also transmitted to the lens module 15, thus preventing the deterioration in the vibration performance.

The first and second stop rings 13 and 19 adjust a position of the lens module 15 along the optical axis. Outer peripheries of the first and second stop rings 13 and 19 are provided with cut screws, and the lens barrel 17 is pinched between the first and second stop rings 13 and 19, and is fitted to a screw structure inside the fixing portion 35. Therefore, the position of the lens barrel 17 can be finely adjusted along the optical axis by a tightening amount of the first and second stop rings 13 and 19. The first and second stop rings 13 and 19 are examples of a method for fixing the lens module 15.

An adhesive is applied between the internal vibration body 7, the lens 5, and the external vibration body 3, and between the internal vibration body 7, the piezoelectric element 9, and the power feeding conductor 11. The material of the adhesive is preferably a solid material such as, for example, an epoxy resin. Since the adhesive material having a high Young's modulus is used, a loss of the vibration can be reduced.

Figure 5:
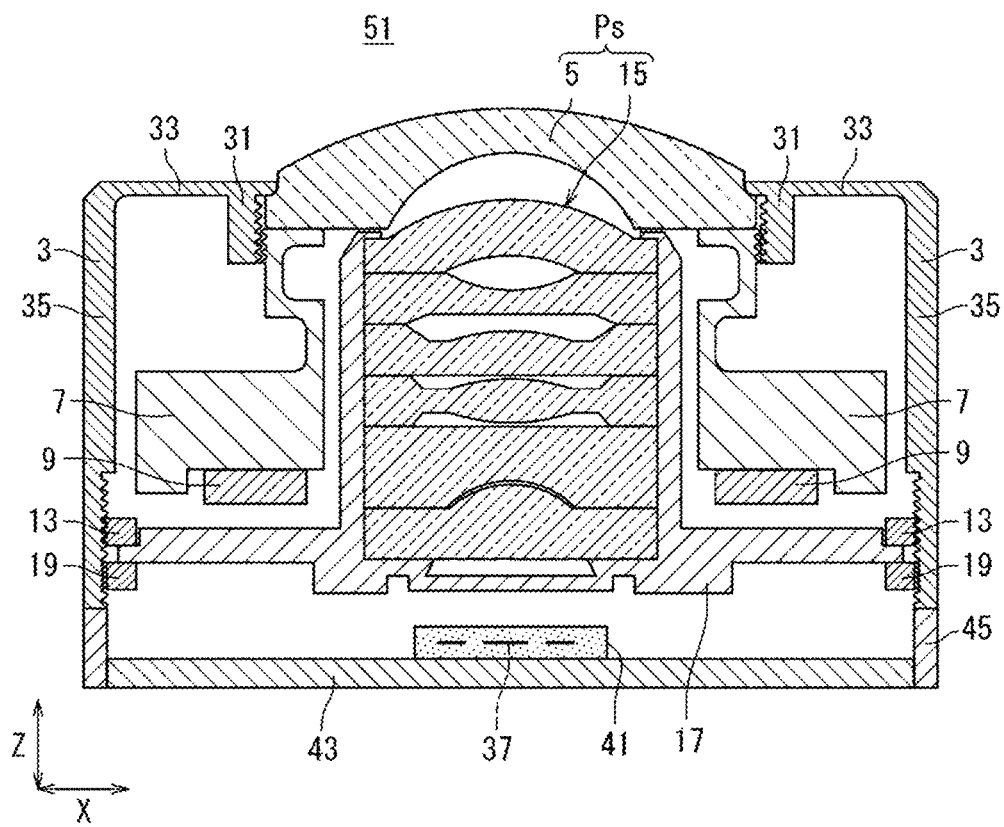
FIG. 5 is a sectional view showing an imaging device including an vibration device of an example embodiment of the present invention.

The optical imaging plane 37 is a plane on which an image is formed by the lens 5 and the lens module 15. As shown in FIG. 5, since the image sensor 41 such as a CMOS image sensor is disposed at this position, an imaging device 51 can be formed. FIG. 5 is a sectional view showing the imaging device 51 including the vibration device 1. A position of a bottom surface of the external vibration body 3 in the optical axis direction is located between a bottom surface of the piezoelectric element 9 and the imaging plane of the image sensor 41. The imaging plane of the image sensor 41 is the same as the optical imaging plane 37.

As shown in FIG. 5, since the image sensor 41 is outside the vibration device 1, the imaging device 51 can be easily assembled. For example, the image sensor 41 is connected to a substrate 43. An imaging object outside the vibration device 1 can be imaged by the image sensor 41 through the lens module 15 and the lens 5 of the vibration device 1. For example, the vibration device 1 is fixed to the substrate 43 with a case 45 interposed therebetween.

Next, in a manufacturing method of the vibration device 1, a portion between the lens 5 and the internal vibration body 7 and a portion between the lens 5 and the external vibration body 3 are filled with adhesives. The external vibration body 3 is tightened before the adhesives are solidified, and thereafter, the adhesives are solidified. Through this manufacturing method, it is possible to continuously maintain a force to pinch the lens 5 between the external vibration body 3 and the internal vibration body 7. Screw-cut portions of the external vibration body 3 and the internal vibration body 7 are also filled with the adhesives, and the adhesive has a function of preventing loosening of the screw. Therefore, when the adhesive is a conductive adhesive, the external vibration body 3 and the internal vibration body 7 can be electrically and stably conductive.

A simulation result of a displacement amount distribution and a stress distribution in the vibration device 1 will be described with reference to FIGS. 6 and 7. In the simulation, for example, a piezoelectric analysis (resonance analysis) is preferably performed by using Femtet (registered trademark) manufactured by Murata Software Co., Ltd. Calculation conditions of the simulation are as follows. The material of the lens 5 corresponds to lead glass having a density of about 4.65 g/cm$^3$ and a Young's modulus of about 125 GPa. A diameter of the lens 5 is about 14.4 mm. The material of the internal vibration body 7 corresponds to SUS420J2 having a density of about 7.75 g/cm$^3$ and a Young's modulus of about 200 GPa. The piezoelectric element 9 has a density of about 7.83 g/cm$^3$, and a voltage of about 60 Vp-p is applied to upper and lower surfaces (surface in contact with the internal vibration body 7 and surface opposite thereto) of the piezoelectric element 9. The piezoelectric element has an outer diameter of about 18 mm, an inner diameter of 12 mm, and the thickness of about 1 mm.

Figure 6:
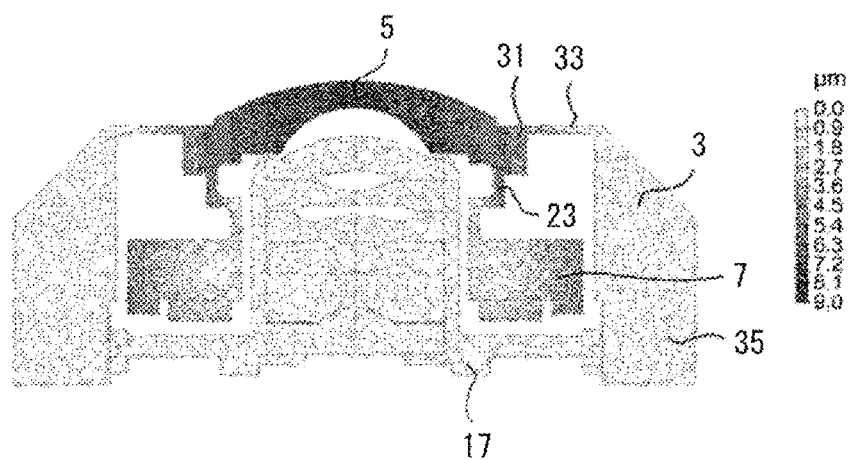
FIG. 6 is a view showing a simulation result of a displacement amount distribution in the vibration device.

FIG. 6 shows a simulation result of a displacement amount distribution in the vibration device 1 of the example embodiment. FIG. 6 shows that the displacement amount increases as a color is darker. As shown in FIG. 6, whereas the lens 5 greatly vibrates, the whole fixing portion 35 of the external vibration body 3 is a node, and the vibration does not leak. The displacement amount of the second connection portion 33 of the external vibration body 3 is reduced to zero as the second connection portion 33 is closer to the fixing portion 35 from the first connection portion 31. A magnitude of an amplitude in the fixing portion 35 is equal to or smaller than about 1/100 of an amplitude in the lens 5 even in a case of a maximum amplitude amount. For this reason, it can be understood that transmission of the vibration of the internal vibration body 7 to the fixing portion 35 through the first and second connection portions 31 and 33 is reduced or prevented. Therefore, the vibration does not propagate to the lens module 15 or the case of the image sensor through the external vibration body 3. In addition, it is possible to efficiently remove the foreign substances such as water droplets or mud adhering to the lens 5.

Figure 7:
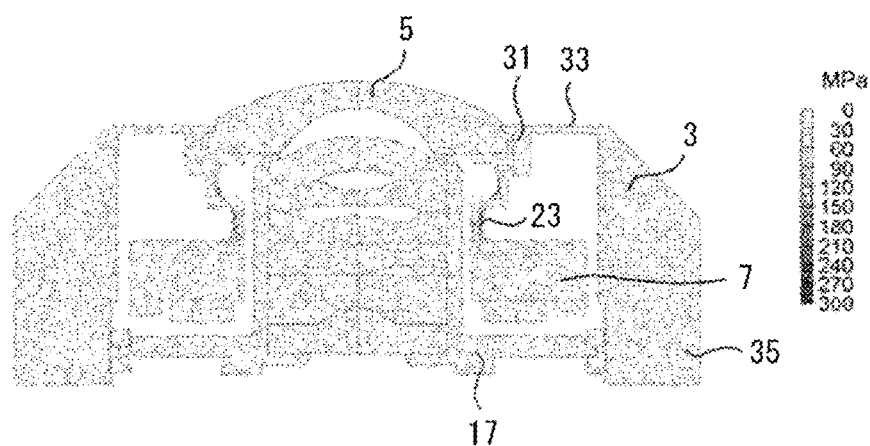
FIG. 7 is a view showing a simulation result of a stress distribution in the vibration device.

FIG. 7 shows a simulation result of a stress distribution in the vibration device 1 of the example embodiment. FIG. 7 shows that stress increases as the color is darker. The internal vibration body 7 has a location with large stress, but the stress of the external vibration body 3 is small. Therefore, a structure of exposing the external vibration body 3 is used, but corrosion fatigue is less likely to occur.

The vibration device 1 of the present example embodiment includes the internal vibration body 7 that amplifies the vibration, the piezoelectric element 9 connected to one end of the internal vibration body 7, and the lens 5 connected to the other end of the internal vibration body 7. The vibration device 1 further includes the external vibration body 3 including the first connection portion 31 connected to the other end side of the internal vibration body 7, and the second connection portion 33 extending outward of the lens 5 from the first connection portion 31 to attenuate the vibration.

Since the second connection portion 33 attenuates the vibration transmitted from the lens 5 and the internal vibration body 7, the vibration transmitted to the whole external vibration body 3 can be reduced, and the vibration transmitted to other members connected to the external vibration body 3 can be reduced. In this manner, it is possible to reduce or prevent a possibility that the vibration escapes from the lens 5. Therefore, the lens 5 can efficiently vibrate.

The present invention is not limited to each of the above-described example embodiments, and can be modified as follows.

Figure 8:
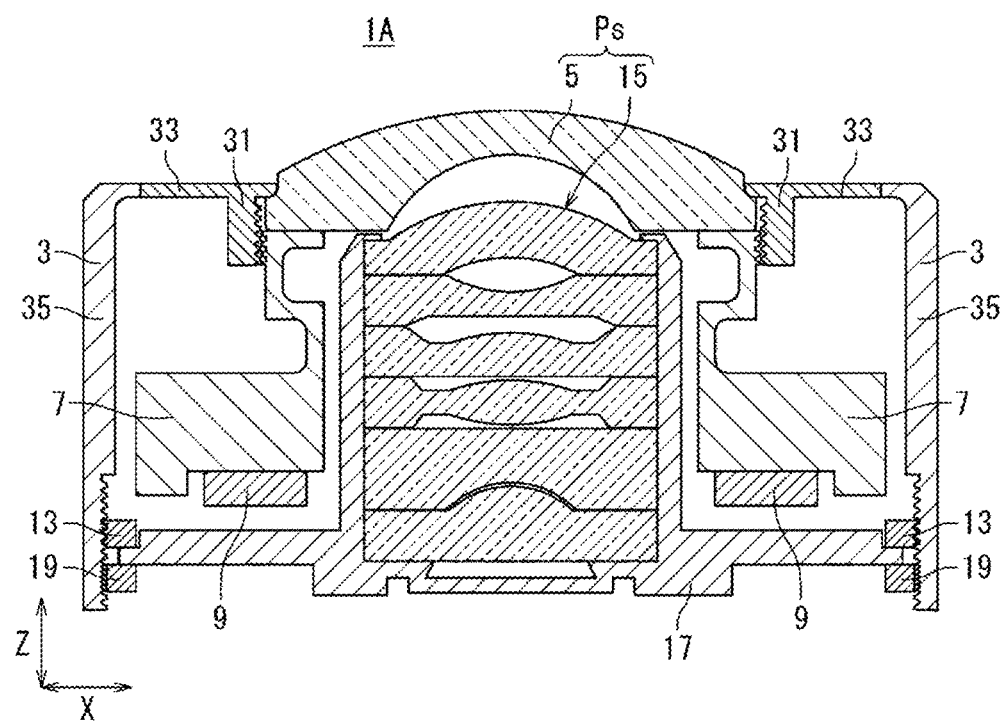
FIG. 8 is a sectional view showing a vibration device according to a modified example of the example embodiment of the present invention.

(1) In the example embodiment described above, the second connection portion 33 and the fixing portion 35 of the external vibration body 3 are formed of the same material, but the present disclosure is not limited thereto. As shown in FIG. 8, a material different from the materials of the second connection portion 33 and the fixing portion 35 may be used. For example, vibration absorption of the second connection portion 33 may be further improved by respectively using materials in which the Young's modulus of the second connection portion 33 of the external vibration body 3 is higher than the Young's modulus of the fixing portion 35. In addition, vibration stability of the fixing portion 35 may be further improved by respectively using materials in which the density of the second connection portion 33 of the external vibration body 3 is lower than the density of the fixing portion 35.

(2) In the example embodiment described above, the first connection portion 31 of the external vibration body 3 is connected to both the lens 5 and the internal vibration body 7, but the present disclosure is not limited thereto. The first connection portion 31 may be connected to the lens 5 without being connected to the internal vibration body 7.

(3) In the example embodiment described above, the lens 5 is exposed from the vibration device 1, but the present disclosure is not limited thereto. The lens 5 may be located inside the vibration device 1, and may be connected to the first connection portion 31 and the internal vibration body 7 by using a glass cover as the light transmission body, for example. In this case, the second connection portion 33 may extend in a direction perpendicular to a direction in which the light is transmitted through the cover.

(4) In the example embodiment described above, the image sensor is located outside the vibration device 1, but the present disclosure is not limited thereto. The vibration device 1 may be used as the imaging device by accommodating the image sensor inside the vibration device 1.

(5) The fitting portion 27 of the internal vibration body 7 and the first connection portion 31 of the external vibration body 3 are not limited to the screw structure, and may be fixed by a fitting structure other than the screw structure. For example, the fitting structure other than the screw structure includes an insertion structure using physical properties of a material, a pinching structure using an intermediate body such as a resin or metal thin plate, an insertion structure using a plurality of projecting portions and a plurality of recessed portions, and a fitting structure using a snap fit. FIGS. 9 to 21 show an example of the vibration device 1 provided with the fitting structure other than the screw structure. In FIGS. 9 to 21, the lens module 15 may be omitted in some cases.

Figure 9:
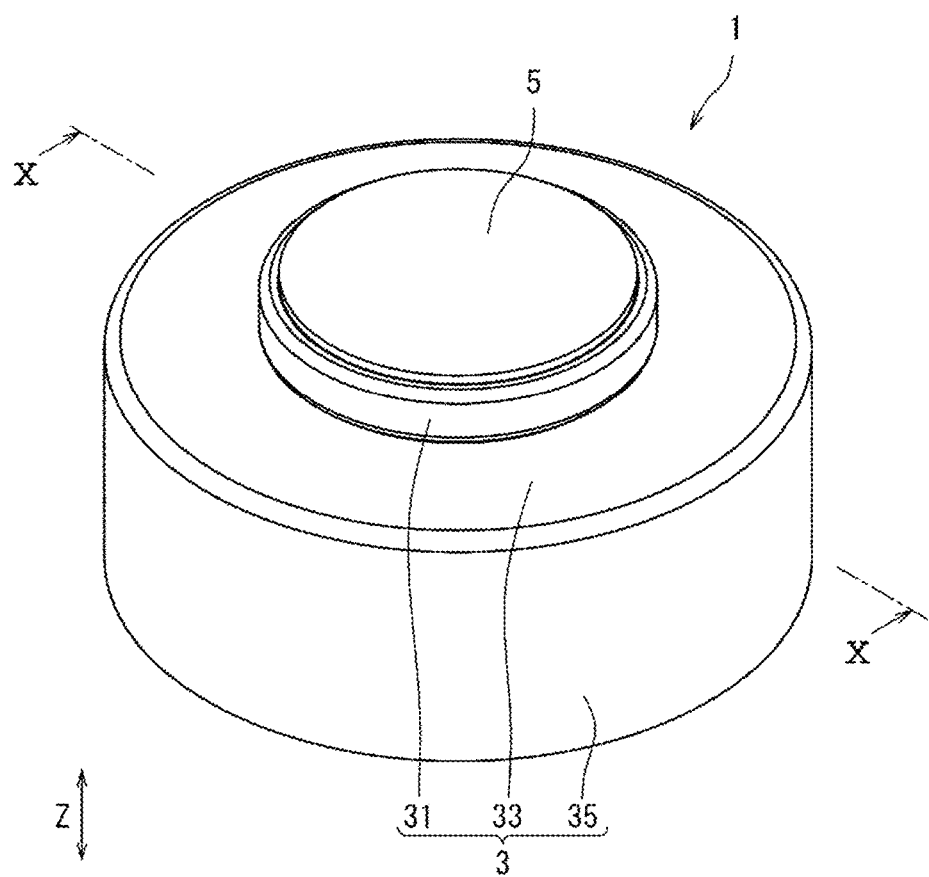
FIG. 9 is a perspective view showing a first modified example of the vibration device in FIG. 1.
Figure 10:
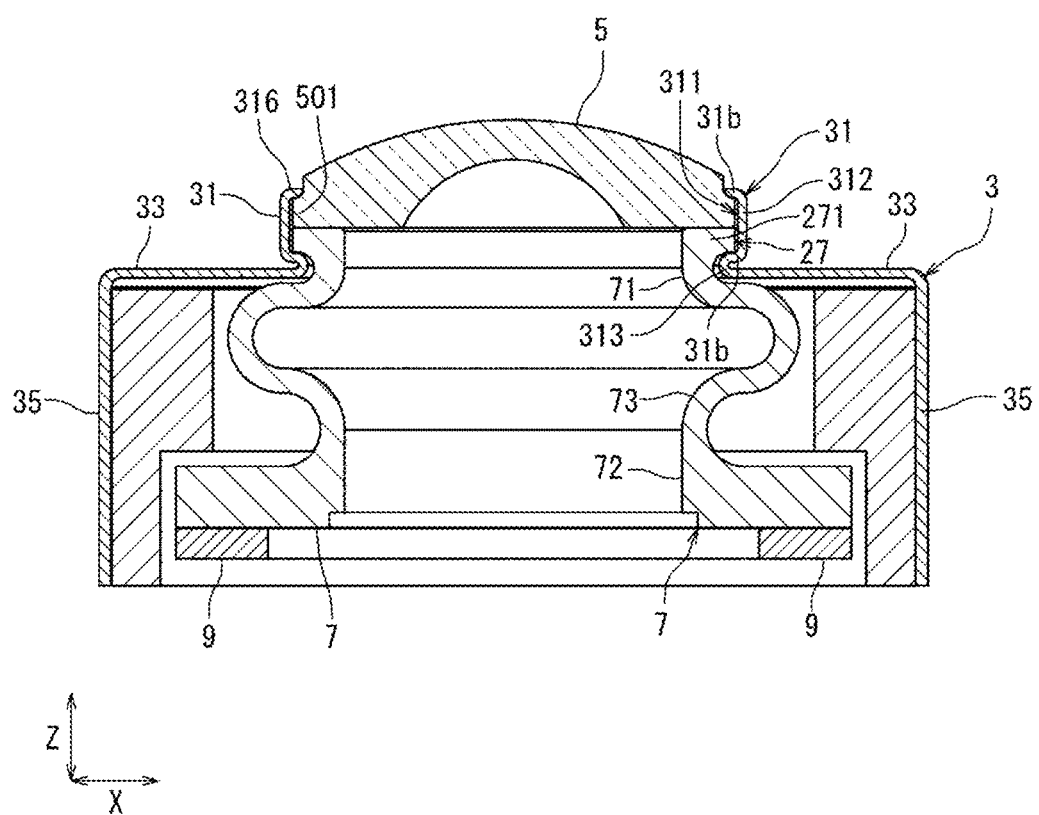
FIG. 10 is a sectional view taken along line X-X in FIG. 9.

The vibration device 1 in FIGS. 9 and 10 is configured such that the fitting portion 27 of the internal vibration body 7 and the first connection portion 31 of the external vibration body 3 are fixed by fitting between a projecting portion 271 and a second recessed portion 311. In this manner, costs for fixing the internal vibration body 7 and the external vibration body 3 can be reduced. In the present example embodiment, as shown in FIG. 9, the vibration device 1 includes the external vibration body 3 having a cylindrical or substantially cylindrical shape and the lens 5 (example of the light transmission body) having a substantially disk shape. As shown in FIG. 10, a projecting portion 501 extending outward in the radial direction is provided in an outer end of the lens 5 in the radial direction.

As shown in FIG. 10, the fitting portion 27 includes the projecting portion 271 provided in the other end of the internal vibration body 7 in a first direction (for example, the Z-direction). The projecting portion 271 extends outward of the lens 5 from the other end of the internal vibration body 7 in a first direction Z along a direction (for example, the X-direction) intersecting the first direction Z.

As shown in FIG. 10, the first connection portion 31 extends from an end close to the internal vibration body 7 in a direction X intersecting the first direction Z of the second connection portion 33 in the first direction Z and along a direction away from the piezoelectric element 9. The first connection portion 31 includes the second recessed portion 311 that accommodates the projecting portion 271 to be fittable. In the vibration device 1 in FIGS. 9 and 10, the first connection portion 31 includes a plate-shaped portion 312, two protruding portions 31b, and a curved portion 313. The plate-shaped portion 312 extends along the first direction Z to form a bottom surface of the second recessed portion 311. The protruding portions 31b each extend from both ends of the plate-shaped portion 312 in the first direction Z in the direction intersecting the first direction Z and in a direction closer to the lens 5. The curved portion 313 connects a tip of the protruding portion 31b close to the second connection portion 33 and an end close to the internal vibration body 7 in the direction intersecting the first direction Z of the second connection portion 33. The second recessed portion 311 has a rectangular or substantially rectangular cross-sectional shape, and is configured such that the projecting portion 271 of the fitting portion 27 and the projecting portion 501 of the lens 5 are simultaneously accommodated to be fittable. That is, the projecting portion 271 of the fitting portion 27 and the projecting portion 501 of the lens 5 are accommodated in and fitted to the second recessed portion 311 in a state of being pinched and held between the two protruding portions 31b. In this manner, the fitting portion 27 of the internal vibration body 7 and the first connection portion 31 of the external vibration body 3 are fixed.

In the present example embodiment, as an example, the internal vibration body 7 is a tubular body, and includes a first portion 71 in contact with the lens 5, a second portion 72 to which the piezoelectric element 9 is attached, and a third portion 73 having a substantially S-shaped cross-sectional shape which connects the first portion 71 and the second portion 72. The first portion 71 has a cylindrical shape whose shape extends in the axial direction (that is, the first direction Z) of the tubular body. The first portion 71 extends in the radial direction of the tubular body to form the fitting portion 27. The second portion 72 is a portion that vibrates with the vibration of the piezoelectric element 9, and has a larger plate thickness than the first portion 71 and the third portion 73. In this manner, the vibration of the piezoelectric element 9 is easily and efficiently transmitted by the lens 5. The third portion 73 is a portion that supports the first portion 71 and transmits the vibration of the second portion 72 to the first portion 71. The first portion 71, the second portion 72, and the third portion 73 may be integrally formed or individually formed. As shown in FIG. 10, a maximum outer dimension of the third portion 73 (=maximum dimension in the X-direction) is larger than a maximum outer dimension of the first portion 71, and a maximum outer dimension of the second portion 72 is larger than a maximum outer dimension of the third portion 73. In this manner, the vibration of the piezoelectric element 9 can be efficiently transmitted to the lens 5.

In the present example embodiment, the second connection portion 33 is located closer to the piezoelectric element 9 than an end 316 of the first connection portion 31 which is spaced away from the piezoelectric element 9 in the first direction Z. In this manner, when applied to the camera, the visual field obstruction to be reflected in the video is less likely to occur. Therefore, the present invention can correspond to the lens 5 having a wide angle of view. (for example, the lens having an angle of view of about 190 degrees).

Figure 11:
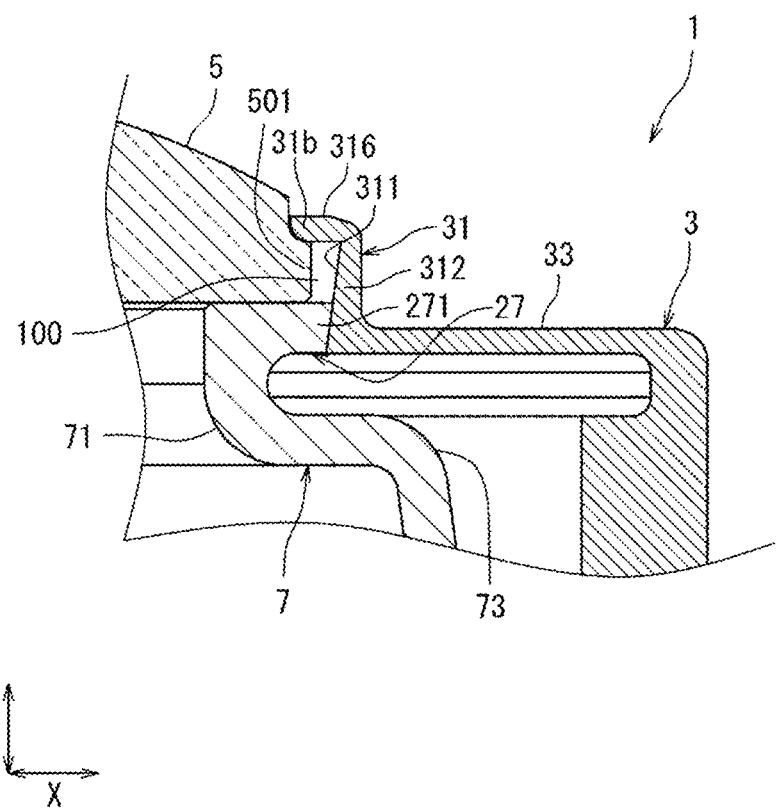
FIG. 11 is a sectional view showing a second modified example of the vibration device in FIG. 1.

The vibration device 1 in FIGS. 9 and 10 may be configured as shown in FIG. 11. The vibration device 1 in FIG. 11 is different from the vibration device 1 in FIGS. 9 and 10 in the following points.

The tip opposing the bottom surface of the second recessed portion 311 and the bottom surface of the projecting portion 271 is inclined to be away from the lens 5 in the direction intersecting the first direction Z as the tip is away from the piezoelectric element 9 in the first direction Z. In this manner, the projecting portion 271 and the second recessed portion 311 are fitted and fixed by elasticity of the materials of the first connection portion 31 and the internal vibration body 7.

The first connection portion 31 includes the plate-shaped portion 312 and one protruding portion 31b. An end of the plate-shaped portion 312 which is close to the second connection portion 33 in the first direction Z is connected to the second connection portion 33, and the protruding portion 31b is provided in an end of the plate-shaped portion 312 which is spaced away from the second connection portion 33 in the first direction Z.

In the vibration device 1 in FIG. 11, an elastic body such as, for example, rubber or an adhesive layer is provided in a portion 100 surrounded by the lens 5, the first connection portion 31 of the external vibration body 3, and the first portion 71 of the internal vibration body 7. In this manner, a load on the lens 5 is reduced.

Figure 12:
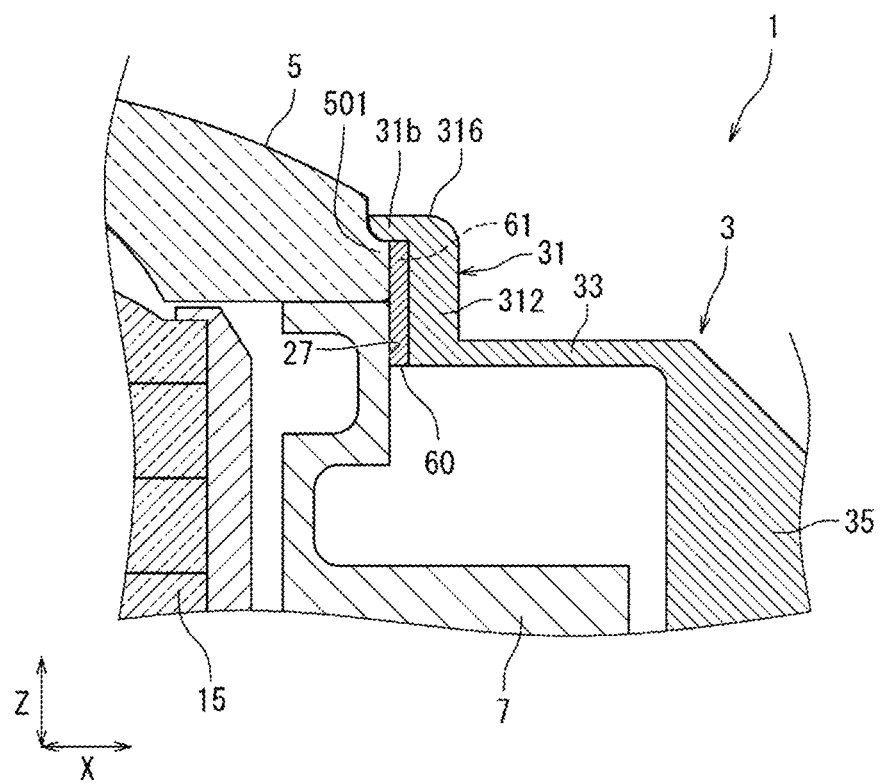
FIG. 12 is a sectional view showing a third modified example of the vibration device in FIG. 1.

The vibration device 1 in FIG. 12 includes an intermediate body 60 to fix the internal vibration body 7 and the external vibration body 3. In this manner, costs to fix the internal vibration body 7 and the external vibration body 3 can be reduced. For example, the intermediate body 60 deforms due to the fitting between the internal vibration body 7 and the external vibration body 3, and a radial pressure applied to the internal vibration body 7 and the external vibration body 3 becomes higher than that in a state where the intermediate body 60 is not present. In this manner, the internal vibration body 7 and the external vibration body 3 are physically fixed. Both can be chemically fixed in such a manner that a thin plate is formed between the internal vibration body 7 and the external vibration body 3 by using a material having a role of a resin adhesive. In the present example embodiment, the intermediate body 60 is preferably formed of the resin or metal thin plate, and is configured such that hardness or the Young's modulus is lower than that of the internal vibration body 7 and the external vibration body 3. For example, a lower limit value of the Young's modulus of the intermediate body 60 is about 0.01 GPa, and an upper limit value of the Young's modulus of the intermediate body 60 is a value smaller than the Young's modulus of the internal vibration body 7 and the external vibration body 3. Since the intermediate body 60 needs to deform by the internal vibration body 7 and the external vibration body 3, the upper limit value of the Young's modulus of the intermediate body 60 needs to be smaller than that of the Young's moduli of both the two vibration bodies. The lower limit value of the Young's modulus of the intermediate body 60 is defined in a range that does not affect vibration performance. The projecting portion 501 extending outward in the radial direction is provided in an outer end of the lens 5 in the radial direction.

As shown in FIG. 12, the internal vibration body 7 includes the fitting portion 27 provided in the other end in the first direction Z and opposing the first connection portion 31 of the external vibration body 3 in the direction intersecting the first direction Z. A gap 61 is provided between the plate-shaped portion 312 of the first connection portion 31 and the fitting portion 27 in the direction intersecting the first direction Z. The gap 61 is formed such that the intermediate body 60 is fittable. The fitting portion 27 of the internal vibration body 7 and the first connection portion 31 of the external vibration body 3 are fixed by being fitted into the gap 61 of the intermediate body 60.

Figure 13:
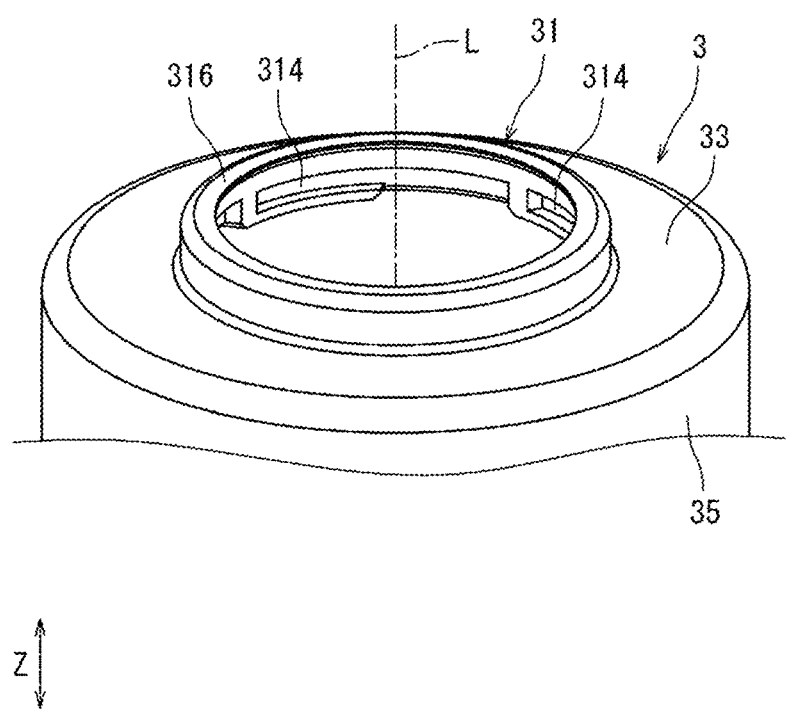
FIG. 13 is a first perspective view showing a fourth modified example of the vibration device in FIG. 1.
Figure 14:
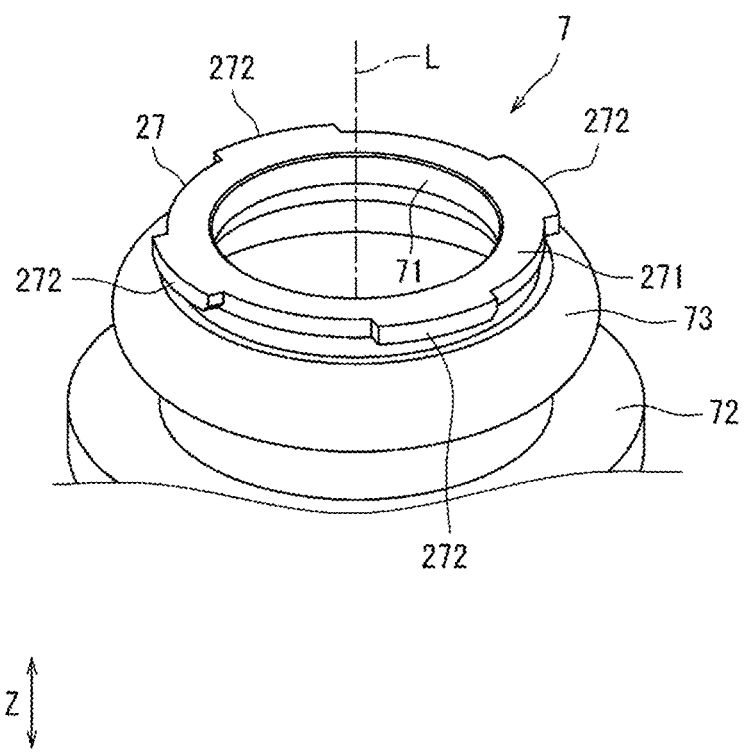
FIG. 14 is a second perspective view showing the fourth modified example of the vibration device in FIG. 1.

The vibration device 1 in FIGS. 13 and 14 is configured such that the fitting portion 27 of the internal vibration body 7 and the first connection portion 31 of the external vibration body 3 are fixed by fitting between a plurality of groove portions and a plurality of claw portions. Any one of the internal vibration body 7 and the external vibration body 3 is configured to be rotatable around a rotation axis L extending along the first direction Z with respect to the other of the internal vibration body 7 and the external vibration body 3. In this manner, costs for fixing the internal vibration body 7 and the external vibration body 3 can be reduced. In the present example embodiment, as shown in FIGS. 13 and 14, each of the internal vibration body 7 and the external vibration body 3 has a substantially cylindrical shape.

As shown in FIG. 13, a plurality of groove portions 314 respectively extending in the circumferential direction with respect to the rotation axis L are provided in the first connection portion 31 of the external vibration body 3. As shown in FIG. 14, the fitting portion 27 is provided with a plurality of claw portions 272 respectively extending in the radial direction with respect to the rotation axis L and accommodated in the plurality of groove portions 314 to be respectively fittable. In the present example embodiment, the external vibration body 3 includes four groove portions 314 (only two are shown in FIG. 13) located at an equal interval in the circumferential direction, and the internal vibration body 7 includes four claw portions 272 corresponding to the four groove portions 314. Each of the groove portions 314 includes an opening opposing the internal vibration body 7 in the radial direction. One end of the groove portion 314 in the circumferential direction is blocked to restrict the movement of the accommodated claw portion 272 in the circumferential direction. Each of the claw portions 272 protrudes in a direction away from the rotation axis L along the radial direction while extending in the circumferential direction from the tip of the projecting portion 271 in the radial direction.

A plurality of claw portions may be provided in the first connection portion 31 of the external vibration body 3, and a plurality of groove portions may be provided in the fitting portion 27 of the internal vibration body 7. That is, the plurality of the groove portions can be provided in the fitting portion 27 without being limited to the first connection portion 31, and the plurality of the claw portions can be provided in the first connection portion 31 without being limited to the fitting portion 27. In this case, for example, each of the claw portions protrudes in a direction closer to the rotation axis L along the radial direction while extending in the circumferential direction from the plate-shaped portion 312 of the first connection portion 31. Each of the groove portions includes an opening opposing the external vibration body 3 in the radial direction. One end of the groove portion in the circumferential direction is blocked to restrict the movement of the accommodated claw portion in the circumferential direction.

After each of the groove portions 314 is filled with an adhesive, the claw portion 272 corresponding to each of the groove portions 314 may be fitted. In this manner, the internal vibration body 7 and the external vibration body 3 can be more firmly fixed.

Figure 15:
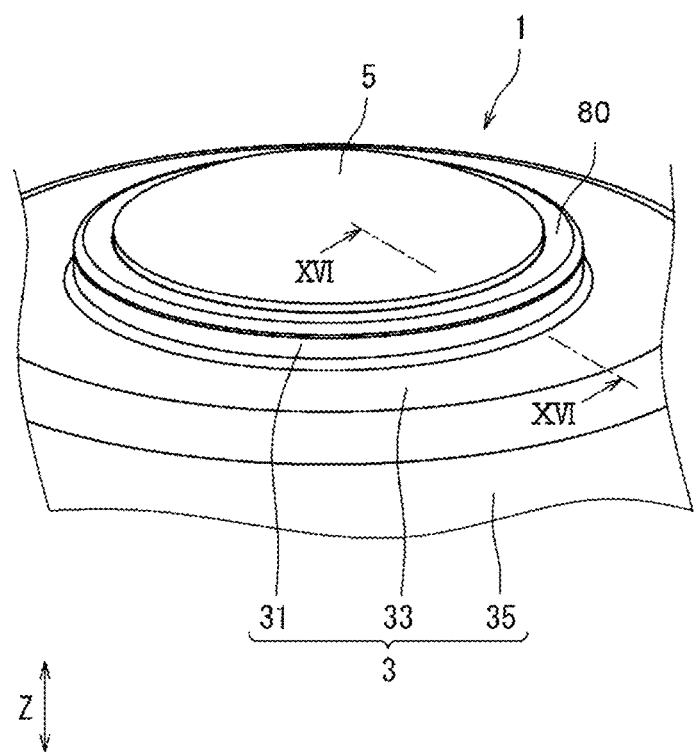
FIG. 15 is a perspective view showing a fifth modified example of the vibration device in FIG. 1.
Figure 16:
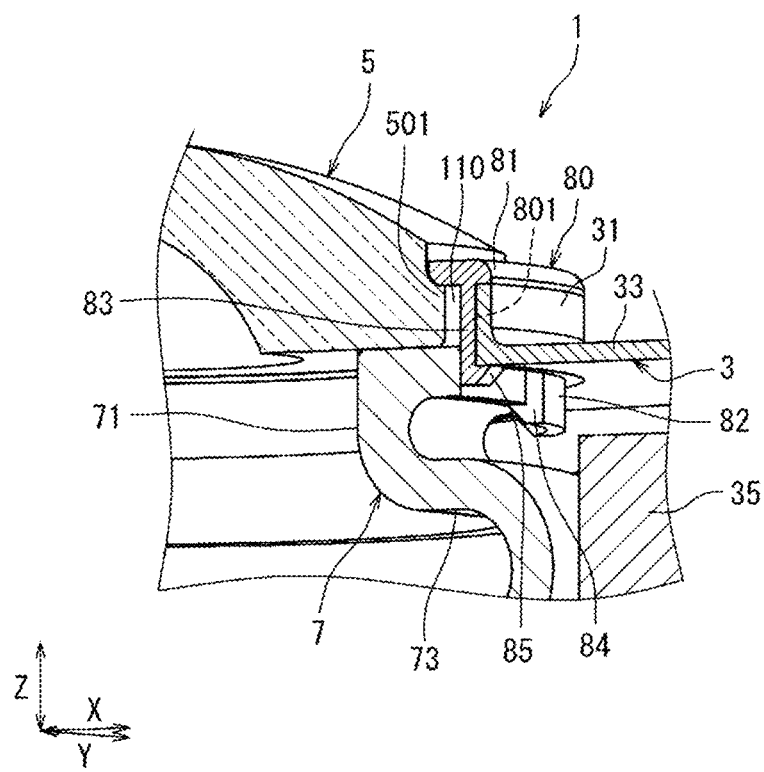
FIG. 16 is a sectional view taken along line XVI-XVI in FIG. 15.
Figure 17:
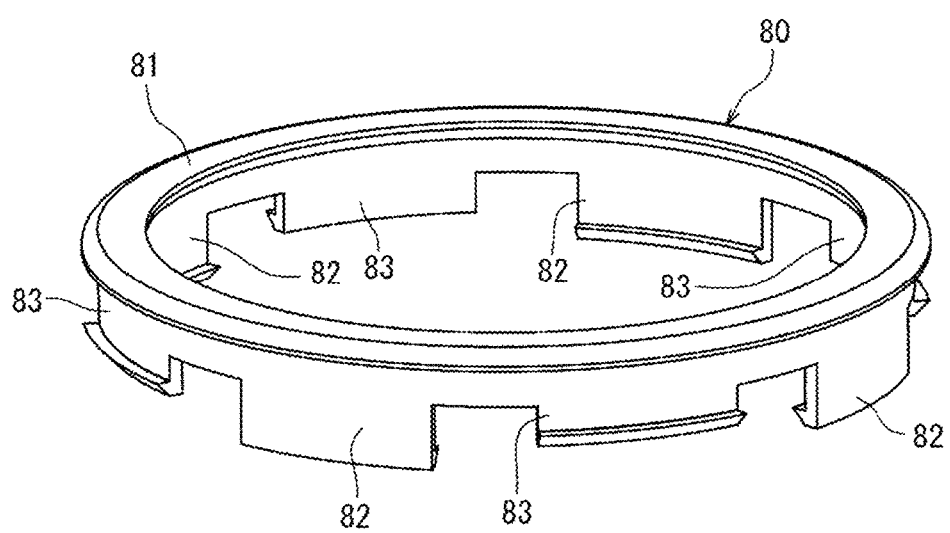
FIG. 17 is a perspective view showing a pressing portion of the vibration device in FIG. 15.

The vibration device 1 in FIGS. 15 to 17 includes a pressing portion 80 that pinches the lens 5 together with the other end of the internal vibration body 7 in the first direction Z. Mechanical fixing can ensure falling prevention of the lens 5. The first connection portion 31 of the external vibration body 3 is connected to the lens 5 with the pressing portion 80 interposed therebetween. In the present example embodiment, as shown in FIG. 15, each of the external vibration body 3 and the lens 5 has a cylindrical or substantially cylindrical shape. As shown in FIG. 16, the projecting portion 501 extending outward in the radial direction is provided in an outer end of the lens 5 in the radial direction.

As shown in FIG. 16, in the vibration device 1 in FIGS. 15 to 17, a gap 801 is provided between the first connection portion 31 and the other end of the internal vibration body 7 in the radial direction (for example, the X-direction) with respect to the optical axis of the lens 5.

As shown in FIGS. 16 and 17, the pressing portion 80 includes a main body portion 81, a first leg portion 82, a second leg portion 83, a first projecting portion 84, and a second projecting portion 85.

As shown in FIG. 17, as an example, the main body portion 81 has an annular or substantially annular shape extending in the circumferential direction with respect to the optical axis of the lens 5. As shown in FIG. 16, the main body portion 81 opposes the first portion 71 which is the other end of the internal vibration body 7 in the first direction Z, and the projecting portion 501 of the lens 5 is located between the main body portion 81 and the first portion 71 of the internal vibration body 7.

As shown in FIG. 17, the first leg portion 82 and the second leg portion 83 are respectively provided in the main body portion 81, and are located at an interval in the circumferential direction. As shown in FIG. 16, each of the first leg portion 82 and the second leg portion 83 extends from the main body portion 81 toward the other end of the internal vibration body 7 along the first direction Z, and is located in the gap 801. In the present example embodiment, the pressing portion 80 preferably includes four first leg portions 82 and four second leg portions 83 which are alternately aligned in the circumferential direction. Each of the first leg portion 82 and the second leg portion 83 is located in an intermediate portion of the main body portion 81 in the radial direction.

As shown in FIG. 16, the first projecting portion 84 is provided in an end of the first leg portion 82 which is spaced away from the main body portion 81 in the first direction Z, and extends inward in the radial direction. In the first direction Z, the lens 5 and the first portion 71 of the internal vibration body 7 are located between the first projecting portion 84 and the main body portion 81. In the present example embodiment, the first projecting portion 84 preferably has a shape tapered inward in the radial direction, for example. A portion of the first projecting portion 84 which opposes the main body portion 81 in the first direction Z is in contact with the first portion 71 of the internal vibration body 7. The second projecting portion 85 is provided in an end of the second leg portion 83 which is spaced away from the main body portion 81 in the first direction Z, and extends outward in the radial direction. In the first direction Z, the first connection portion 31 is located between the second projecting portion 85 and the main body portion 81. In the present example embodiment, the second projecting portion 85 has a shape tapered outward in the radial direction. A portion of the second projecting portion 85 which opposes the main body portion 81 in the first direction Z is in contact with the first connection portion 31 of the external vibration body 3.

For example, assembly of the vibration device 1 in FIGS. 15 to 17 is performed as follows.

The pressing portion 80 is attached to the external vibration body 3 to form an assembly.

The lens 5 and the internal vibration body 7 are attached to the formed assembly.

In the pressing portion 80, all components may be integrally formed, or some or all of the components may be separately provided. The main body portion 81 is not limited to the annular or substantially annular shape, and may have a polygonal annular shape, for example. For example, the main body portion 81 may be formed by thermal caulking. The lengths of the first projecting portion 84 and the second projecting portion 85 in the radial direction may be the same as or different from each other. An elastic body such as rubber or an adhesive layer may be provided in a portion 110

(shown in FIG. 16) surrounded by the lens 5, the internal vibration body 7, and the pressing portion 80. In this manner, a load on the lens 5 is reduced.

Figure 18:
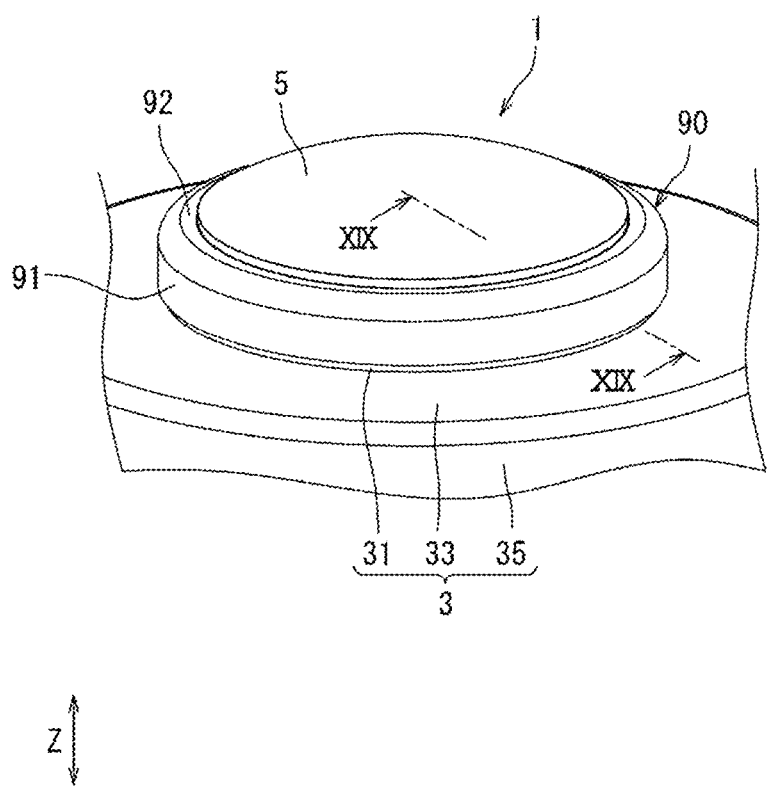
FIG. 18 is a perspective view showing a sixth modified example of the vibration device in FIG. 1.
Figure 19:
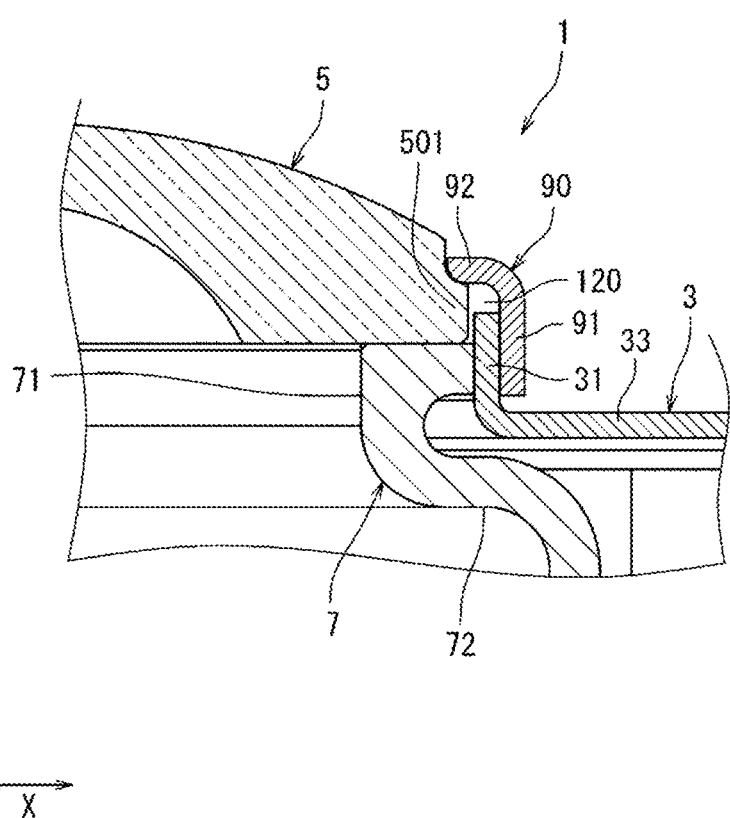
FIG. 19 is a sectional view taken along line XIX-XIX in FIG. 18.

The vibration device 1 in FIGS. 18 and 19 includes a cap 90. The mechanical fixing can reduce a load on the lens 5 while ensuring falling prevention of the lens 5. In the present example embodiment, as shown in FIG. 18, each of the external vibration body 3 and the lens 5 has a cylindrical or substantially cylindrical shape. As shown in FIG. 19, the projecting portion 501 extending outward in the radial direction is provided in an outer end of the lens 5 in the radial direction.

As shown in FIG. 19, the cap 90 includes a cap body 91 and a protruding portion 92, and is made of a resin or metal, for example.

The cap body 91 covers the first connection portion 31 in the direction (for example, the X-direction) intersecting the first direction Z. In the present example embodiment, the cap body 91 extends along the first direction Z, is located outside the first connection portion 31 in the radial direction, and is in contact with the first connection portion 31.

The protruding portion 92 is provided in an end of the cap body 91 which is spaced away from the piezoelectric element 9 in the first direction Z. The protruding portion 92 protrudes toward the lens 5 along the direction intersecting the first direction Z, and faces the first portion 71 which is the other end of the internal vibration body 7 in the first direction Z. The projecting portion 501 of the lens 5 is located between the protruding portion 92 and the first portion 71 of the internal vibration body 7. In the vibration device 1 in FIGS. 18 and 19, the lens 5 is pinched between the protruding portion 92 and the first portion 71 of the internal vibration body 7, and the first connection portion 31 is connected to the lens 5.

An elastic body such as, for example, rubber or an adhesive layer may be provided in a portion 120 (shown in FIG. 19) surrounded by the lens 5, the external vibration body 3, the internal vibration body 7, and the cap 90. In this manner, a load on the lens 5 is reduced.

Figure 20:
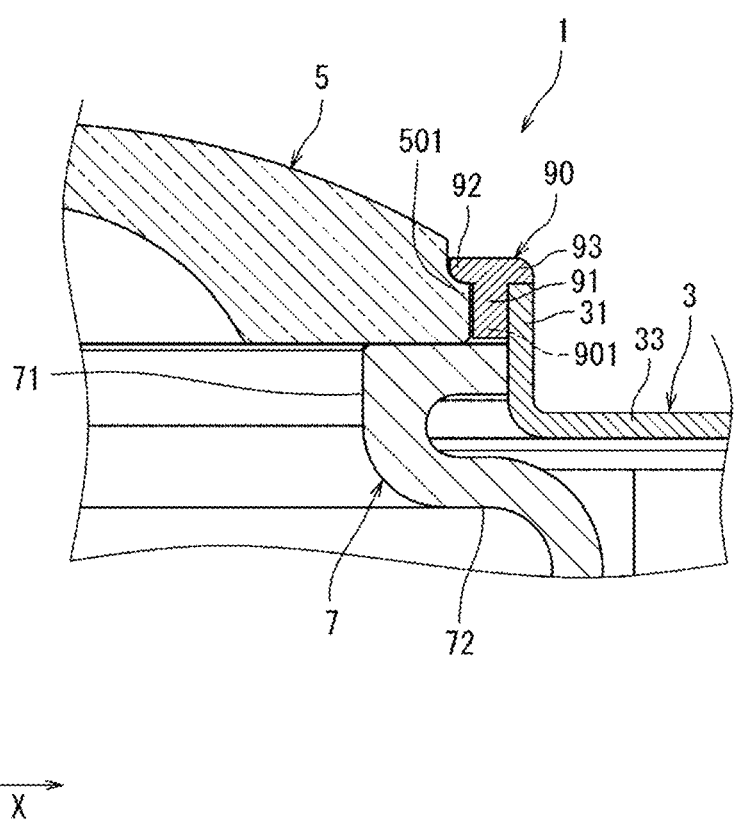
FIG. 20 is a sectional view showing a seventh modified example of the vibration device in FIG. 1.

The vibration device 1 shown in FIGS. 18 and 19 may be configured as shown in FIG. 20. In the vibration device 1 in FIG. 20, the following points are different from those of the vibration device 1 in FIGS. 18 and 19.

The cap body 91 is located in a gap 901 between the lens 5 and the first connection portion 31 in the direction (for example, the X-direction) intersecting the first direction Z.

The cap 90 includes a second protruding portion 93 extending in a direction opposite to the protruding portion 92 from the cap body 91.

Figure 21:
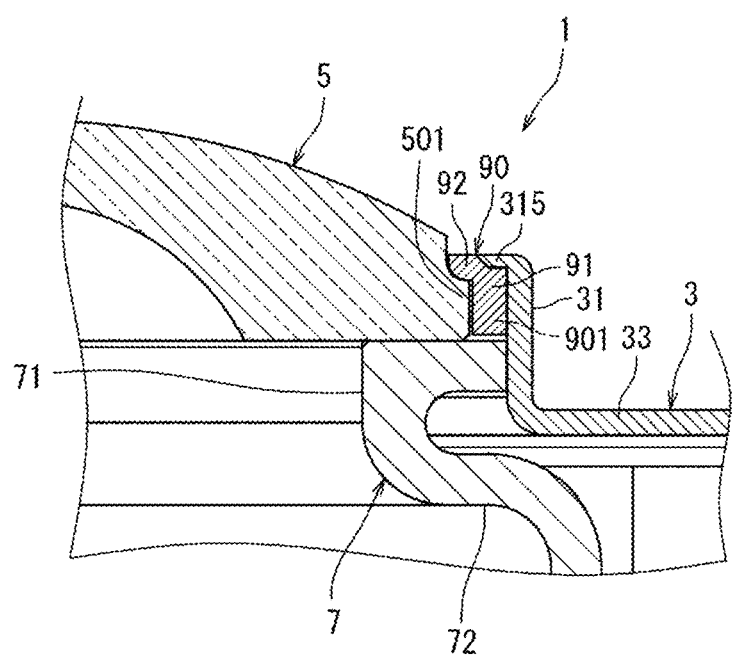
FIG. 21 is a sectional view showing an eighth modified example of the vibration device in FIG. 1.

Instead of providing the second protruding portion 93, for example, as shown in FIG. 21, a protruding portion 315 may be provided in the first connection portion 31. The protruding portion 315 is provided in an end of the first connection portion 31 which is spaced away from the second connection portion 33 in the first direction Z, and extends from the first connection portion 31 toward the lens 5 along the direction intersecting in the first direction Z. The protruding portion 315 opposes the first portion 71 of the internal vibration body 7 in the first direction z, and pinches the cap body 91 together with the first portion 71 in the first direction Z.

Figure 22:
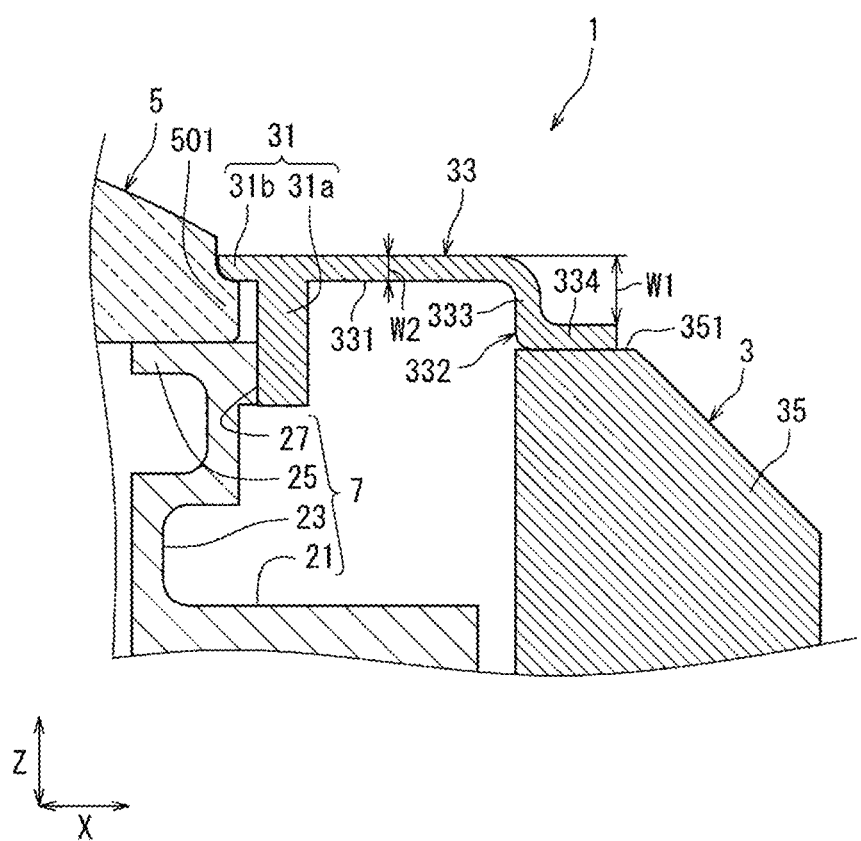
FIG. 22 is a sectional view showing a ninth modified example of the vibration device in FIG. 1.

(6) The second connection portion 33 and the fixing portion 35 of the external vibration body 3 are not limited to a case of being formed of the same material, and may be formed of different materials. An example of this case is shown in FIG. 22. In the vibration device 1 in FIG. 22, the second connection portion 33 prefer-ably includes a first portion 331 and a second portion 332, and the fixing portion 35 includes a joint portion 351.

The first portion 331 is located farther away from the piezoelectric element 9 than the fixing portion 35 in the first direction Z, and extends from the first connection portion 31 along the direction (for example, the X-direction) intersecting the first direction Z. The second portion 332 extends from an end of the first portion 331 which is spaced away from the first connection portion 31 in the direction intersecting the first direction Z toward the piezoelectric element 9 along the first direction Z. The joint portion 351 is provided in an end of the first portion 331 which is close to the fixing portion 35 in the first direction Z, and extends along the direction intersecting the first direction Z such that the second portion 332 is joined. A dimension W1 of the second portion 332 in the first direction Z is larger than a dimension W2 of the first portion 331 in the first direction Z.

In the present example embodiment, the joint portion 351 includes a surface extending in the direction intersecting the first direction Z. The second portion 332 preferably has an L-shaped cross section or a substantially L-shaped cross section, and includes a portion 333 extending from the first portion 331 along the first direction Z and a portion 334 extending along the joint portion 351. The portion 333 extending along the first direction Z may be parallel or substantially parallel to the first direction Z, or may intersect the first direction Z.

In the vibration device 1 in FIG. 22, a relationship between the dimension W1 of the second portion 332 in the first direction Z and a stress value applied to a portion where the second connection portion 33 and the fixing portion 35 are joined is calculated by a simulation. In the simulation, a piezoelectric analysis and a stress analysis are preferably performed by using Femtet (registered trademark) manufactured by Murata Software Co., Ltd. Calculation conditions of the simulation are as follows.

The second connection portion 33: formed of a material corresponding to aluminum having a density of about 2,698.9 kg/m$^3$ and a Young's modulus of about 68.5 GPa. The dimension (=thickness) W2 in the first direction Z is set to about 0.4 mm.

The fixing portion 35: formed of a material corresponding to SUS420J2 having a density of about 7,750 kg/m$^3$ and a Young's modulus of about 200 GPa.

Figure 23:
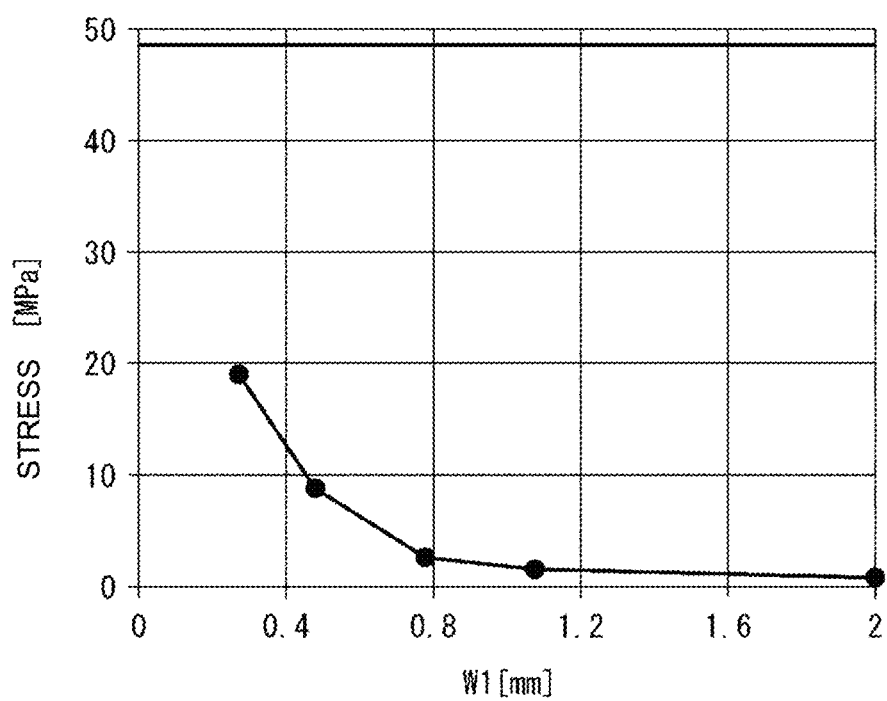
FIG. 23 is a graph showing a relationship between a dimension of a second portion of the vibration device in FIG. 22 in a first direction and a stress value applied to a portion to which a second connection portion and a fixing portion are joined.

A result of the simulation is shown in FIG. 23. As shown in FIG. 23, when W1 is about 0.4 mm (W2) or larger, the stress value applied to the portion where the second connection portion 33 and the fixing portion 35 are joined is significantly reduced. That is, since the vibration device 1 is configured as shown in FIG. 22, stress applied to the portion where the second connection portion 33 and the fixing portion 35 are joined can be reduced.

In view of vibration performance, it is preferable that an expression of "W2×1"≥W1≤"W2×10" is satisfied. When W1 exceeds "W2×10", a volume of the fixing portion 35 is too small, thereby causing a possibility that the vibration performance deteriorates.

Figure 24:
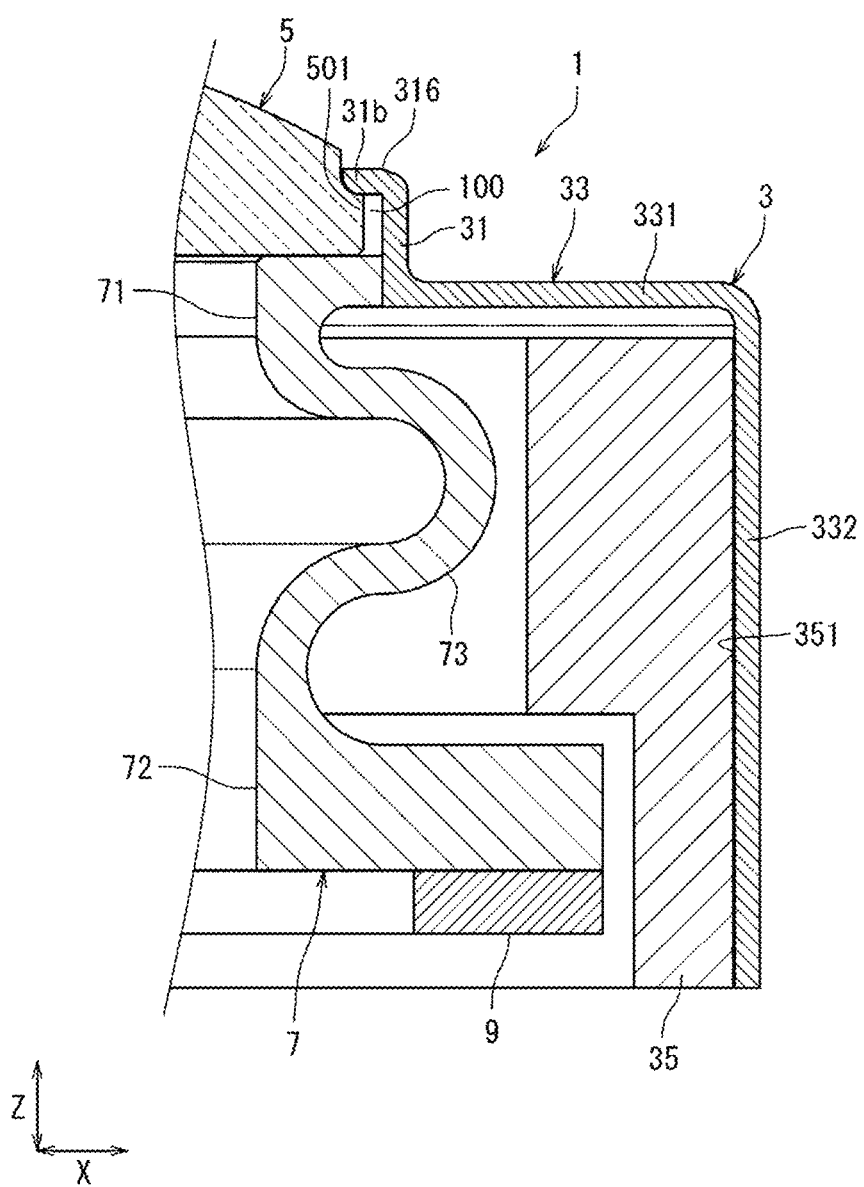
FIG. 24 is a sectional view showing a tenth modified example of the vibration device in FIG. 1.

The vibration device 1 in FIG. 22 may be configured as shown in FIG. 24. In the vibration device 1 in FIG. 24, the following points are different from those of the vibration device 1 in FIG. 22. In FIG. 24, the lens module 15 is omitted.

The second portion 332 of the second connection portion 33 extends to a position farther separated from the first portion 331 than the piezoelectric element 9 in the first direction Z.

The joint portion 351 of the fixing portion 35 is provided in an end spaced away from the internal vibration body 7 in the direction (for example, the X-direction) intersecting the first direction Z, and extends along the first direction Z such that the second portion 332 is joined.

According to the configuration of the vibration device 1 in FIG. 24, the joint portion 351 is not exposed outward. Therefore, joining reliability between the second connection portion 33 and the fixing portion 35 is improved. In the vibration device 1 in FIG. 24, the second portion 332 is joined to the entire surface of the joint portion 351, but the second portion 332 may be joined to a portion of the joint portion 351.

Figure 25:
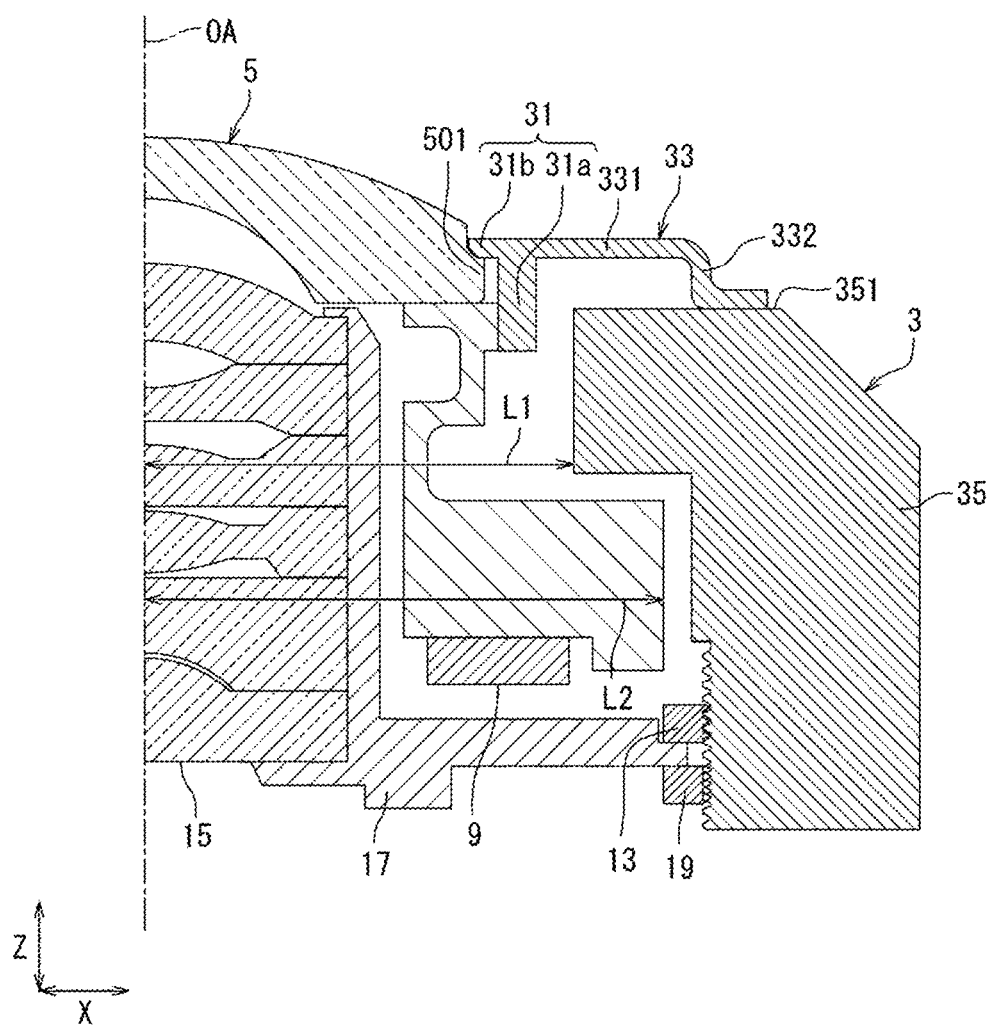
FIG. 25 is a sectional view showing an eleventh modified example of the vibration device in FIG. 1.

(7) For example, the fixing portion 35 of the external vibration body 3 may be configured as shown in FIG. 25. In the vibration device 1 in FIG. 25, a distance L1 from an optical axis OA in the radial direction with respect to the optical axis OA to an inner end of the fixing portion 35 of at least a portion in the radial direction is shorter than a distance L2 from the optical axis OA in the radial direction to an outer end of the internal vibration body 7 in the radial direction. In this manner, the volume of the fixing portion 35 can be increased. Therefore, vibration stability of the fixing portion 35 can be further improved. In addition, as the distance L1 is shorter, the inner diameter of the tubular shape of the fixing portion 35 is less likely to deform. The inner diameter of the tubular shape is effective to the fourth power, based on a geometrical moment of inertia. Therefore, the vibration is effectively confined, compared to a case of simply increasing the volume in a vertical direction.

Any desired example embodiments or modified examples in various example embodiments or modified examples described above can be appropriately combined to achieve each advantageous effect thereof. In addition, a combination of the example embodiments, a combination of the examples, or a combination of the example embodiments and the examples can be adopted, and a combination of characteristics between different example embodiments or between different examples can also be adopted.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration device comprising:
an internal vibration body to amplify a vibration;
a piezoelectric element connected to one end of the internal vibration body in a first direction;
a light transmission body connected to another end of the internal vibration body in the first direction; and
an external vibration body including:
a first connection portion connected to the light transmission body; and
a second connection portion extending outward of the light transmission body from the first connection portion along a direction intersecting the first direction to attenuate the vibration.

2. The vibration device according to claim 1, wherein the second connection portion extends in a direction perpendicular or substantially perpendicular to a direction in which light is transmitted through the light transmission body.

3. The vibration device according to claim 2, wherein the second connection portion extends annularly.

4. The vibration device according to claim 1, wherein the second connection portion is located closer to the piezoelectric element than an end of the first connection portion which is spaced away from the piezoelectric element in the first direction.

5. The vibration device according to claim 1, wherein
the external vibration body includes a fixing portion connected to the second connection portion; and
the second connection portion has a thickness smaller than a thickness of the fixing portion.

6. The vibration device according to claim 5, wherein
the light transmission body is a lens; and
the vibration device further includes a lens module provided on an optical axis of the lens.

7. The vibration device according to claim 6, wherein the lens module is connected to the fixing portion of the external vibration body.

8. The vibration device according to claim 1, wherein the first connection portion includes a protruding portion that protrudes to a light transmission body side, and
the light transmission body is pinched between the protruding portion of the first connection portion and the another end of the internal vibration body.

9. The vibration device according to claim 1, further comprising:
a pressing portion pinching the light transmission body together with the another end of the internal vibration body in the first direction; wherein
the first connection portion is connected to the light transmission body with the pressing portion interposed therebetween;
a gap is provided between the first connection portion and the another end of the internal vibration body in a radial direction with respect to an optical axis extending along the first direction of the light transmission body; and
the pressing portion includes:
a main body portion extending in a circumferential direction with respect to the optical axis of the light transmission body, and opposing the another end of the internal vibration body in the first direction, the light transmission body being located between the another end of the internal vibration body and the main body portion;
a first leg portion and a second leg portion which are respectively provided in the main body portion, which are located at an interval in the circumferential direction with respect to the optical axis, and which are located in the gap by extending from the main body portion toward the another end of the internal vibration body along the first direction;
a first projecting portion provided in an end of the first leg portion which is spaced away from the main body portion in the first direction, and extending inward in a radial direction with respect to the optical axis, the light transmission body and the another end of the internal vibration body being located between the main body portion and the first projecting portion in the first direction; and
a second projecting portion provided in an end of the second leg portion which is spaced away from the main body portion in the first direction, and extending outward in the radial direction, the first connection portion being located between the main body and the second projecting portion in the first direction.

10. The vibration device according to claim 1, further comprising:
a cap including:
a cap body covering the first connection portion in the direction intersecting the first direction; and
a protruding portion provided in an end of the cap body which is spaced away from the piezoelectric element in the first direction, protruding toward the light transmission body along the direction intersecting the first direction, and opposing the another end of the internal vibration body in the first direction;
the cap connecting the first connection portion the light transmission body by pinching the light transmission body between the protruding portion and the another end of the internal vibration body.

11. The vibration device according to claim 1, further comprising:
a cap including:
a cap body located between the light transmission body and the first connection portion in the direction intersecting the first direction, and extending along the first direction; and
a protruding portion provided in an end of the cap body which is spaced away from the piezoelectric element in the first direction, protruding toward the light transmission body along the direction intersecting the first direction, and opposing the another end of the internal vibration body in the first direction; wherein
a gap is provided between the light transmission body and the first connection portion in the direction intersecting the first direction;
the cap body is located in the gap; and
the cap connects the first connection portion to the light transmission body by pinching the light transmission body between the protruding portion and the another end of the internal vibration body.

12. The vibration device according to claim 1, further comprising:
a fitting portion connected to the first connection portion of the external vibration body on the another end side of the internal vibration body; wherein
the fitting portion of the internal vibration body and the first connection portion of the external vibration body are fixed by a screw structure.

13. The vibration device according to claim 1, wherein
the internal vibration body includes a fitting portion provided in the another end in the first direction and connected to the first connection portion of the external vibration body;
the fitting portion includes a projecting portion extending outward of the light transmission body from the another end of the internal vibration body in the first direction along the direction intersecting the first direction;
the first connection portion includes a second recessed portion accommodating the projecting portion to be fittable; and
the fitting portion of the internal vibration body and the first connection portion of the external vibration body are fixed by fitting between the projecting portion and the second recessed portion.

14. The vibration device according to claim 1, further comprising:

an intermediate body to fix the internal vibration body and the external vibration body; wherein
the internal vibration body includes a fitting portion provided in the another end in the first direction and opposing the first connection portion of the external vibration body in the direction intersecting the first direction;
a gap to which the intermediate body is fitted is provided between the first connection portion and the fitting portion in the direction intersecting the first direction; and
the fitting portion of the internal vibration body and the first connection portion of the external vibration body are fixed by fitting the intermediate body into the gap.

15. The vibration device according to claim 1, wherein
the internal vibration body includes a fitting portion provided in the another end in the first direction and connected to the first connection portion of the external vibration body;
any one of the internal vibration body and the external vibration body is configured to be rotatable around a rotation axis extending along the first direction with respect to the other of the internal vibration body and the external vibration body;
a plurality of groove portions respectively extending in a circumferential direction with respect to the rotation axis are provided in any one of the first connection portion and the fitting portion;
a plurality of claw portions respectively extending in a radial direction with respect to the rotation axis and accommodated to be respectively fittable to the plurality of groove portions are provided in the other of the first connection portion and the fitting portion; and
the fitting portion of the internal vibration body and the first connection portion of the external vibration body are fixed by the fitting between the plurality of groove portions and the plurality of claw portions.

16. The vibration device according to claim 1, wherein
the internal vibration body has a cylindrical shape; and
the external vibration body has a hollow quadrangular columnar shape.

17. The vibration device according to claim 1, wherein a Young's modulus of a material of the internal vibration body is higher than a Young's modulus of a material of the external vibration body.

18. The vibration device according to claim 1, wherein
the external vibration body includes a fixing portion connected to the second connection portion; and
a Young's modulus of the second connection portion of the external vibration body is higher than a Young's modulus of the fixing portion of the external vibration body.

19. The vibration device according to claim 18, wherein the second connection portion includes:
a first portion located farther from the piezoelectric element than the fixing portion in the first direction and extending from the first connection portion along the direction intersecting the first direction; and
a second portion extending from an end of the first portion which is spaced away from the first connection portion in the direction intersecting the first direction toward the piezoelectric element along the first direction;
the fixing portion includes a joint portion provided in an end close to the first portion in the first direction, extending along the direction intersecting the first direction, and to which the second portion is joined; and a dimension of the second portion in the first direction is equal to or larger than a dimension of the first portion in the first direction.

20. The vibration device according to claim 18, wherein the second connection portion includes:
- a first portion located farther from the piezoelectric element than the fixing portion in the first direction and extending from the first connection portion along the direction intersecting the first direction; and
- a second portion extending from an end of the first portion which is spaced away from the first connection portion in the direction intersecting the first direction toward the piezoelectric element along the first direction; and the fixing portion includes a joint portion provided in an end spaced away from the internal vibration body in the direction intersecting the first direction, extending along the first direction, and to which the second portion is joined.

21. The vibration device according to claim 1, wherein the external vibration body includes a fixing portion connected to the second connection portion; and
a density of the second connection portion of the external vibration body is lower than a density of the fixing portion of the external vibration body.

22. The vibration device according to claim 1, wherein the external vibration body includes a fixing portion connected to the second connection portion;
the light transmission body has an optical axis extending along the first direction; and
a distance from the optical axis in a radial direction with respect to the optical axis to an inner side end of at least a portion of the fixing portion in the radial direction is shorter than a distance from the optical axis in the radial direction to an outer side end of the internal vibration body in the radial direction.

23. The vibration device according to claim 1, wherein the internal vibration body includes a tubular body portion and a thin portion; and
the thin portion has a smaller thickness than the tubular body portion.

24. An imaging device comprising:
a vibration device including:
- an internal vibration body to amplify a vibration;
- a piezoelectric element connected to one end of the internal vibration body;
- a lens connected to another end of the internal vibration body;
- an external vibration body including a first connection portion connected to the another end side of the internal vibration body, and a second connection portion extending outward of the lens from the first connection portion to attenuate the vibration; and
a lens module provided on an optical axis of the lens; and
an image sensor provided on the optical axis of the lens and the lens module.

25. The imaging device according to claim 24, wherein a position of a bottom surface of the external vibration body in an optical axis direction is located between a bottom surface of the piezoelectric element and an imaging plane of the image sensor.

* * * * *